United States Patent
Lien et al.

(10) Patent No.: US 10,845,886 B2
(45) Date of Patent: Nov. 24, 2020

(54) COHERENT MULTI-LOOK RADAR PROCESSING

(71) Applicant: Google LLC, Mountain View, CA (US)

(72) Inventors: Jaime Lien, Mountain View, CA (US); Octavio Ponce Madrigal, Munich (DE); Erik M. Olson, Cupertino, CA (US); Patrick M. Amihood, Palo Alto, CA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 16/719,722

(22) Filed: Dec. 18, 2019

(65) Prior Publication Data

US 2020/0125181 A1    Apr. 23, 2020

Related U.S. Application Data

(63) Continuation of application No. 16/105,958, filed on Aug. 20, 2018, now Pat. No. 10,579,154.

(51) Int. Cl.
*G06F 3/01* (2006.01)
*G01B 9/02* (2006.01)
*G01S 13/88* (2006.01)
*G06K 9/00* (2006.01)

(52) U.S. Cl.
CPC ......... *G06F 3/017* (2013.01); *G01B 9/02083* (2013.01); *G01S 13/88* (2013.01); *G06K 9/00355* (2013.01)

(58) Field of Classification Search
CPC ..... G06F 3/017; G01B 9/02083; G01S 13/88; G06K 9/00355
See application file for complete search history.

(56) References Cited

U.S. PATENT DOCUMENTS

| 10,579,154 B1 | 3/2020 | Lien et al. |
| 2009/0322328 A1 | 12/2009 | Cehelnik |
| 2011/0181510 A1 | 7/2011 | Hakala et al. |

(Continued)

FOREIGN PATENT DOCUMENTS

| CN | 102782612 | 11/2012 |
| TW | 201728049 | 8/2017 |

(Continued)

OTHER PUBLICATIONS

"EP Appeal Decision", European Application No. 10194359.5, May 28, 2019, 20 pages.

(Continued)

*Primary Examiner* — Michael Pervan
(74) *Attorney, Agent, or Firm* — Colby Nipper PLLC

(57) ABSTRACT

Techniques and apparatuses are described that implement a smartphone-based radar system capable of detecting user gestures using coherent multi-look radar processing. Different approaches use a multi-look interferometer or a multi-look beamformer to coherently average multiple looks of a distributed target across two or more receive channels according to a window that spans one or more dimensions in time, range, or Doppler frequency. By coherently averaging the multiple looks, a radar system generates radar data with higher gain and less noise. This enables the radar system to achieve higher accuracies and be implemented within a variety of different devices. With these accuracies, the radar system can support a variety of different applications, including gesture recognition or presence detection.

20 Claims, 14 Drawing Sheets

(56) References Cited

U.S. PATENT DOCUMENTS

| | | | |
|---|---|---|---|
| 2015/0234477 | A1 | 8/2015 | Abovitz et al. |
| 2017/0102457 | A1 | 4/2017 | Li et al. |
| 2018/0046255 | A1 | 2/2018 | Rothera et al. |
| 2020/0057504 | A1 | 2/2020 | Lien et al. |

FOREIGN PATENT DOCUMENTS

| | | |
|---|---|---|
| WO | 2017131545 | 8/2017 |
| WO | 2020040919 | 2/2020 |

OTHER PUBLICATIONS

"Galaxy S4 Air Gesture", Galaxy S4 Guides, retrieved from: https://allaboutgalaxys4.com/galaxy-s4-features-explained/air-gesture/ on Sep. 3, 2019, 4 pages.
"International Search Report and Written Opinion", PCT Application No. PCT/US2019/042852, dated Nov. 21, 2019, 17 pages.
"Notice of Allowance", U.S. Appl. No. 16/105,958, dated Sep. 27, 2019, 8 Pages.
"Samsung Galaxy S4 Air Gestures", Video retrieved from https://www.youtube.com/watch?v=375Hb87yGcg, May 7, 2013, 4 pages.
Gu, et al., "A Two-Tone Radar Sensor for Concurrent Detection of Absolute Distance and Relative Movement for Gesture Sensing", IEEE Sensors Letters vol. 1, No. 3, Jun. 2017, Jun. 2017, 4 pages.
Lien, et al., "Soli: Ubiquitous Gesture Sensing with Millimeter Wave Radar", ACM Transactions on Graphics (TOG), ACM, US, vol. 35, No. 4, Jul. 11, 2016 (Jul. 11, 2016), pp. 1-19, XP058275791, ISSN: 0730-0301, DOI: 10.1145/2897824.2925953, Jul. 11, 2016, 19 pages.
Lombardini, et al., "Spaceborne Tomographic SAR Techniques for Analyzing Garbled Urban Scenarios: Array Processing Advances and Experiments", Joint Urban Remote Sensing Event, Munich, Germany, Apr. 11-13, 2011, Apr. 2011, 4 pages.
Nasr, et al., "A Highly Integrated 60 GHz 6-Channel Transceiver with Antenna in Package for Smart Sensing and Short-Range Communication", IEEE Journal of Solid-State Circuits, vol. 51, No. 9, Sep. 2016, Sep. 2016, 11 pages.
Wang, et al., "Interacting with Soli: Exploring Fine-Grained Dynamic Gesture Recognition in the Radio-Frequency Spectrum", UIST 2019, Oct. 16-19, 2016, Tokyo, Japan, Oct. 2016, 10 pages.
"Foreign Office Action", Taiwanese Application No. 108123383, dated Aug. 17, 2020, 3 pages.

COHERENT MULTI-LOOK RADAR PROCESSING

RELATED APPLICATION

This application claims priority to, and is a continuation of, U.S. Utility patent application Ser. No. 16/105,958, filed on Aug. 20, 2018, which is incorporated herein by reference in its entirety.

BACKGROUND

Radars are useful devices that can detect and track targets. While radar is a common tool used in military and air-traffic-control operations, technological advances are making it possible to integrate radars in commercial devices. In many cases, a radar may replace bulky and expensive sensors, such as a camera, and provide improved performance in the presence of different environmental conditions, such as low lighting and fog, or with moving or overlapping targets. While it may be advantageous to use radar, there are many challenges associated with integrating radar in commercial devices.

One such problem involves restrictions that a small consumer device may impose on a radar's design or operation. To satisfy size or layout constraints, for example, fewer antenna elements and various antenna element spacings may be used. Other constraints may limit a bandwidth of a radar signal, transmission power, an update rate, and so forth. Consequently, the radar's design may result in degraded signal-to-noise ratio performance, which may make it challenging to achieve sufficient accuracies for some applications. As such, effective operation and capability of a radar integrated within a consumer device may be significantly reduced, which may limit the types of applications the radar can support or the types of consumer devices the radar can be implemented within.

SUMMARY

Techniques and apparatuses are described that implement a smartphone-based radar system capable of detecting user gestures using coherent multi-look radar processing. The described techniques enable a radar system to detect a distributed target using coherent multi-look radar processing. The radar system employs coherent averaging to obtain a statistical estimation of the distributed target's radar signature. Multiple looks (e.g., samples or cells) are coherently averaged across two or more receive channels according to a window that spans one or more dimensions (e.g., time, range, or Doppler frequency). Different approaches include a multi-look interferometer or a multi-look beamformer, which respectively perform interferometry or beamforming operations based on the coherent averaging to produce position data. Using coherent averaging, variations resulting from multiple phase centers of a distributed target are averaged, which improves a signal-to-noise ratio of the position data. With a higher signal-to-noise ratio, the radar system can realize target accuracies to support a variety of different applications, including gesture recognition or presence detection, regardless of any hardware limitations that may be present. The coherent multi-look radar processing techniques can be tailored to support a variety of devices that have different computational capabilities or power constraints.

Aspects described below include a smartphone comprising a radar system and a radar-based application. The radar system includes an antenna array, a transceiver, a coherent multi-look module, and a position estimation module. The antenna array includes at least two receiving antenna elements configured to receive a radar signal that is reflected by a target. The transceiver includes at least two receive channels respectively coupled to the at least two receiving antenna elements. The transceiver is configured to process the reflected radar signal via the at least two receive channels to produce complex radar data associated with each of the at least two receive channels. The complex radar data comprises multiple samples. The coherent multi-look module is configured to coherently average the multiple samples within the complex radar data across the at least two receive channels using a window. Based on the coherent averaging, the coherent multi-look module is configured to produce position data. The position estimation module is configured to determine positions associated with the gesture based on the position data. The radar-based application is configured to recognize the gesture performed by the target based on the positions determined by the position estimation module.

Aspects described below also include a computer-readable storage media comprising computer-executable instructions that, responsive to execution by a processor, implement a coherent multi-look module and a position estimation module. The coherent multi-look module is configured to accept complex radar data comprising multiple samples. The complex radar data is associated with at least two receive channels and is based on a radar signal that is reflected by a target. The coherent multi-look module is also configured to coherently average the multiple samples within the complex radar data across the at least two receive channels using a window. Based on the coherent averaging, the coherent multi-look module is configured to produce position data. The position estimation module is configured to determine a position of the target based on the position data.

Aspects described below also include a method that detects a distributed target using coherent multi-look radar processing. The method includes receiving a radar signal that is reflected by a target using at least two receiving antenna elements of an antenna array. The method also includes processing the reflected radar signal using at least two receive channels to produce complex radar data associated with each of the at least two receive channels. The complex radar data comprises multiple samples. Using a window, the method includes coherently averaging the multiple samples within the complex radar data across the at least two receive channels. The method additionally includes producing position data based on the coherent averaging. Based on the position data, the method includes determining a position of the target.

Aspects described below also include a system with means for coherently averaging multiple samples of complex radar data across at least two receive channels based on a window to produce position data.

BRIEF DESCRIPTION OF THE DRAWINGS

Apparatuses for and techniques implementing a smartphone-based radar system capable of detecting user gestures using coherent multi-look radar processing are described with reference to the following drawings. The same numbers are used throughout the drawings to reference like features and components:

FIG. 2-1 illustrates an example distributed target at different observation angles.

FIG. 2-2 illustrates example complex radar data for a distributed target at different observation angles.

FIG. 6-1 illustrates an example flow sequence for implementing a smartphone-based radar system capable of detecting user gestures using coherent multi-look radar processing.

FIG. 6-2 illustrates an example flow sequence performed by a coherent multi-look module for implementing a smartphone-based radar system capable of detecting user gestures using coherent multi-look radar processing.

DETAILED DESCRIPTION

Overview

Figure 1:
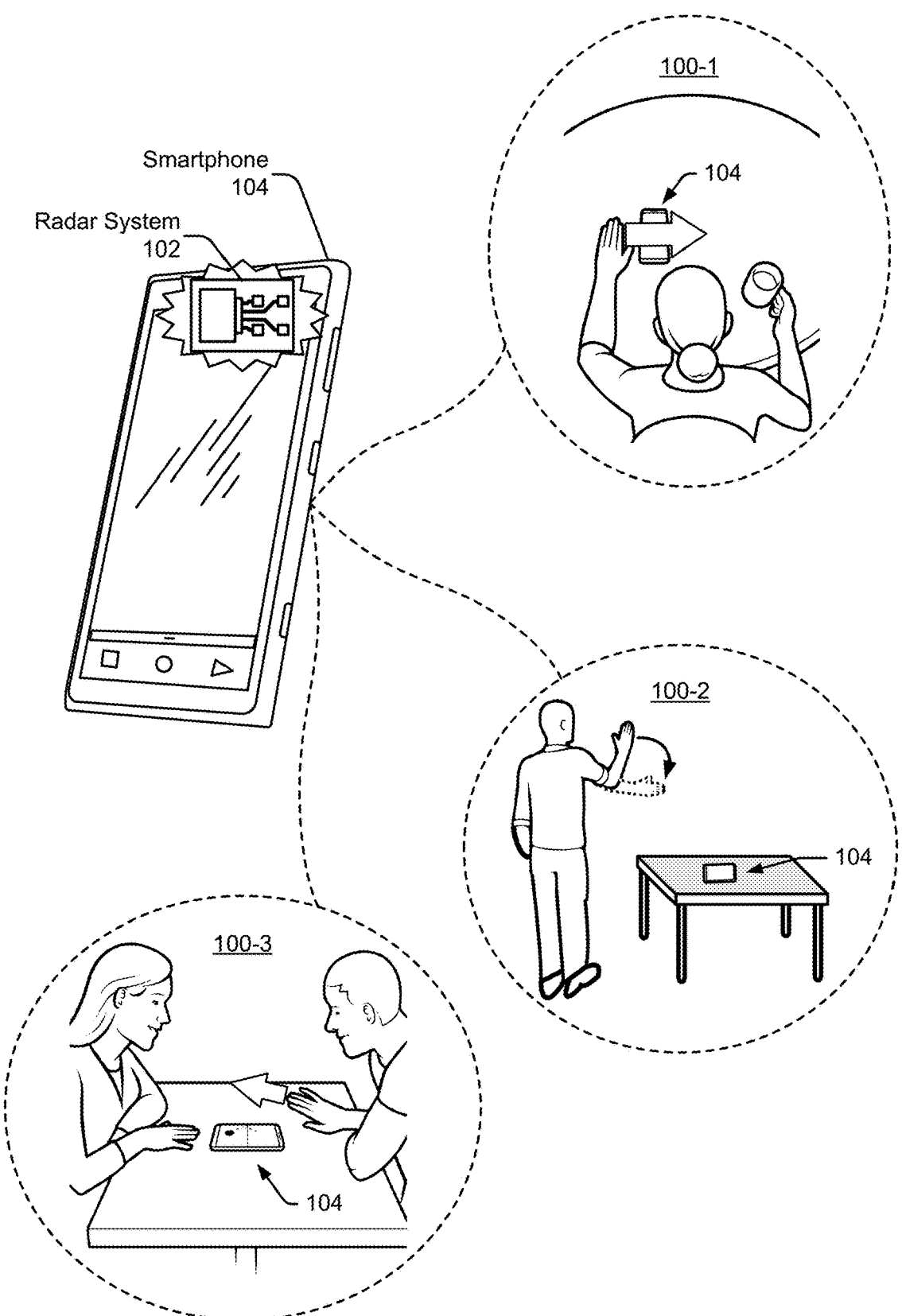
FIG. 1 illustrates example environments in which a smartphone-based radar system capable of detecting user gestures using coherent multi-look radar processing can be implemented.

Achieving target accuracies is important for many radar functions, including performing gesture recognition, detecting small targets, detecting targets at far distances, tracking fast motions, distinguishing between multiple targets, and so forth. Many design factors influence a degree of accuracy that can be realized by a radar system. Some approaches, for example, may increase a signal-to-noise ratio of a received signal by increasing transmission power or use expensive hardware designed to reduce noise. Other radar systems may utilize higher update rates, generate wide-bandwidth radar signals, employ additional antenna elements, or have an optimal antenna element spacing, which respectively enhance resolutions in time and Doppler-frequency dimensions, a range dimension, or angular dimensions. With either higher signal-to-noise ratio performance or enhanced resolutions, realized accuracies may be improved. Unless indicated otherwise by the particular context herein, increased accuracy refers to an increased degree of refinement, an increased conformity to truth, or both the increased degree of refinement and the increased conformity to truth.

Integrating the radar system within a consumer device, however, may make it challenging to implement these techniques. The consumer device, for example, may have a limited amount of available power. As such, the radar system may not be able to increase transmission power or utilize higher update rates. In some cases, a size or layout constraint of the consumer device may limit a quantity of antenna elements or result in a sub-optimal antenna element spacing, which can degrade an angular resolution. Other hardware limitations or frequency limitations may cause the radar system to generate narrow-bandwidths radar signals instead of wide-bandwidth radar signals. With these limitations, it may be challenging for some radars to achieve target accuracies.

These target accuracies may also be challenging to realize for detecting distributed targets, which have non-deterministic radar signatures. Example types of distributed targets include human body parts (e.g., finger, hand, face, or appendage) or a human body. From a radar's perspective, a distributed target has multiple phase centers (e.g., scattering points), which cause a radar signature of the distributed target to vary across different observation angles. While observing a distributed target, the observation angle can change due to motion of the distributed target or the radar. As the observation angle changes, an amplitude or phase of the radar signature may vary, which increases an error or uncertainty in position data produced using radar processing techniques appropriate for non-distributed targets (e.g., targets with deterministic radar signatures).

This document describes techniques and devices for implementing a smartphone-based radar system capable of detecting user gestures using coherent multi-look radar processing. The described techniques enable a radar system to detect a distributed target using coherent multi-look radar processing. The radar system employs coherent averaging to obtain a statistical estimation of the distributed target's radar signature. Multiple looks (e.g., samples or cells) are coherently averaged across two or more receive channels according to a window that spans one or more dimensions (e.g., time, range, or Doppler frequency). Different approaches include a multi-look interferometer or a multi-look beamformer, which respectively perform interferometry or beamforming operations based on the coherent averaging to produce position data. Using coherent averaging, variations resulting from multiple phase centers of a distributed target are averaged, which improves a signal-to-noise ratio of the position data. With a higher signal-to-noise ratio, the radar system can realize target accuracies to support a variety of different applications, including gesture recognition or presence detection, regardless of any hardware limitations that may be present. The coherent multi-look radar processing techniques can be tailored to support a variety of devices that have different computational capabilities or power constraints. This document now turns to an example environment, after which an example apparatus, example methods, and an example computing system are described.

Example Environment

FIG. 1 is an illustration of example environments in which techniques using, and an apparatus including, a smartphone-based radar system capable of detecting user gestures using coherent multi-look radar processing may be embodied. In the depicted environments 100-1, 100-2, and 100-3, a radar system 102 is embedded within a smartphone 104. Some embodiments of the radar system 102 are particularly advantageous as applied in the context of smartphones, such as the smartphone 104, for which there is a convergence of issues such as a need for low power, a need for processing efficiency, limitations in a spacing and layout of antenna elements, and other issues, and are even further advantageous in the particular context of smartphones for which radar detection of fine hand gestures is desired. Although the embodiments are particularly advantageous in the described context of a smartphone for which fine radar-detected hand gestures is required, it is to be appreciated that the applicability of the features and advantages of the present invention is not necessarily so limited, and other embodiments involving other types of electronic devices may also be within the scope of the present teachings. Although the smartphone 104 is shown as a smart phone, the smartphone 104 may be implemented as any suitable computing or electronic device, as described in further detail with respect to FIG. 3. The radar system 102 may be configured to track a user's gestures for touch-free control, detect a presence of one or more users, track one or more users around the smartphone 104 for specific applications, and so forth.

Exemplary overall lateral dimensions of the smartphone 104 can be, for example, approximately eight centimeters by approximately fifteen centimeters. Exemplary footprints of the radar system 102 can be even more limited, such as approximately four millimeters by six millimeters with antennas included. Exemplary power consumption of the radar system 102 may be on the order of a few milliwatts to several milliwatts (e.g., between approximately two milliwatts and twenty milliwatts). The requirement of such a limited footprint for the radar system 102, which is needed to accommodate the many other desirable features of the smartphone 104 in such a space-limited package (e.g., a camera, a fingerprint sensor, a display, and so forth) combined with power and processing limitations, can lead to compromises in the accuracy and efficacy of radar gesture detection, at least some of which can be overcome in view of the teachings herein.

In the environments 100-1, 100-2, and 100-3, users make different hand gestures that traverse multiple observation angles. In general, an observation angle is an incident angle with respect to a line-of-sight along which the radar system 102 "sees" a target (e.g., a user's hand) The observation angle may also be considered an aspect angle if an orientation of the target's velocity vector is considered to identify the observation angle. In the environment 100-1, a user makes a scrolling gesture by moving a hand above the smartphone 104 along a horizontal dimension (e.g., from a left side of the smartphone 104 to a right side of the smartphone 104). A waving gesture is made by a user in the environment 100-2 as the user's arm rotates about an elbow. In the environment 100-3, a user makes a pushing gesture by moving a hand above the smartphone 104 along a vertical dimension (e.g., from a bottom side of the smartphone 104 to a top side of the smartphone 104). Other types of gestures or motions may also be made. For example, a user may make a reaching gesture by moving a hand towards the smartphone 104. As another example, a knob-turning gesture may be made by curling fingers of a hand to grip an imaginary door knob. The fingers and hand are rotated in a clockwise or counter-clockwise fashion to mimic an action of turning the imaginary door knob. Another example spindle-twisting gesture may be performed by rubbing a thumb and at least one other finger together. Each of these example gesture types may be detected by the radar system 102. Upon detecting each of these gestures, the smartphone 104 may perform an action, such as display new content, move a cursor, activate one or more sensors, open an application, and so forth. In this way, the radar system 102 provides touch-free control of the smartphone 104. Because the hand is a distributed target, however, it may be challenging for some radar processing techniques to obtain accurate measurements to identify the gesture. Using coherent multi-look radar processing however, the radar system 102 can better recognize the gesture even in the presence of many design limitations or hardware constraints that may exist. Properties of a distributed target are further described with respect to FIG. 2.

Figures 1, 2:
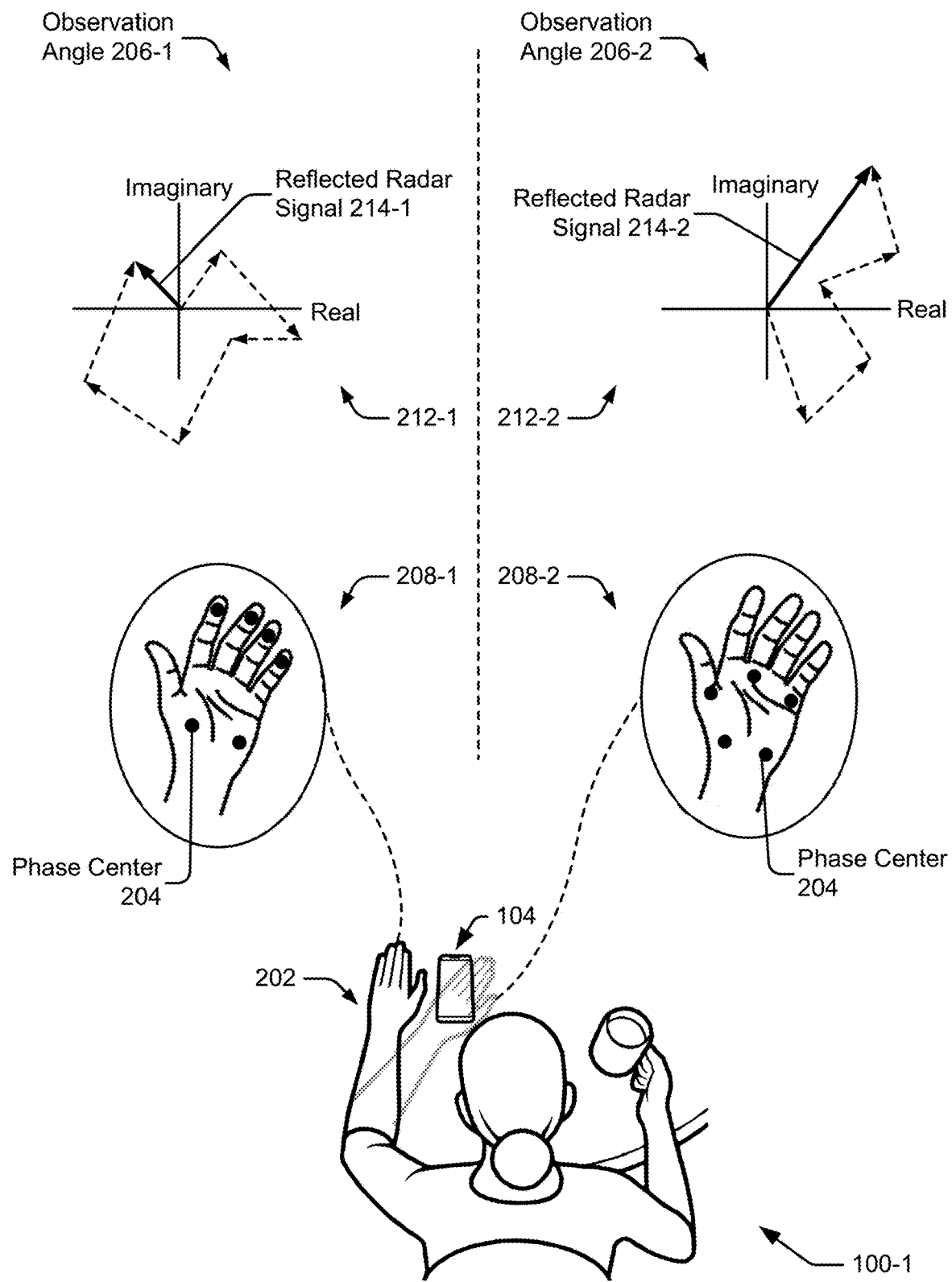
Figure 2:
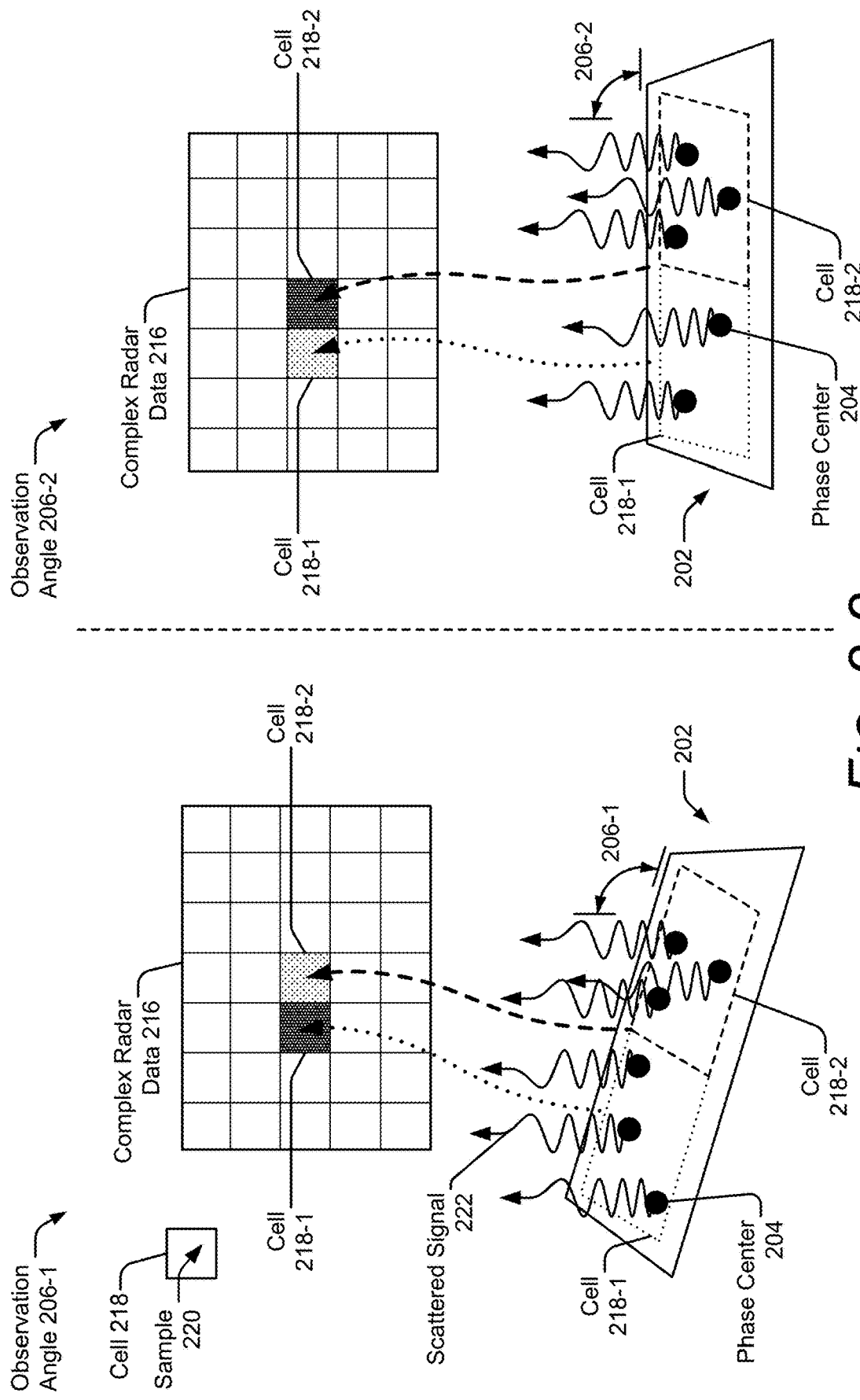

FIG. 2-1 illustrates an example distributed target at different observation angles. In this example, the distributed target is shown to be a hand 202 of a user within the environment 100-1 of FIG. 1. Because the hand 202 is a distributed target, it has multiple phase centers 204, the quantity and respective positions of which may vary at different observation angles. Each of the phase centers 204 reflects a portion of a radar signal (e.g., reflects a portion of a transmitted radar signal) towards the radar system 102. Due to differences in reflectivity properties of the hand 202 at each of the phase centers 204, the reflected portions of the radar signal may have different phases or amplitudes. Differences in relative path lengths between each of the phase centers 204 and the radar system 102 may also exist. These differences result in the reflected portions constructively or destructively interfering with one another. A resulting superposition or combination of these reflected portions produce a reflected radar signal 214 that is observed by the radar system 102.

At a first time, the hand 202 is located towards a left side of the smartphone 104 at a first observation angle 206-1. As shown on the left side of FIG. 2-1 at 208-1, the hand 202 has six phase centers 204 at the first observation angle 206-1. These phase centers 204 reflect portions of the radar signal and have respective amplitudes and phases as represented by dashed-lined vectors in a vector diagram 212-1. A resulting superposition or combination of these reflected signals produce a reflected radar signal 214-1 having an amplitude and phase represented by a solid-lined vector in the vector diagram 212-1.

As the user performs a left-to-right scrolling gesture, a second observation angle 206-2 occurs at another time with the hand 202 positioned above the smartphone 104. On the right side of FIG. 2-1 at 208-2, the hand 202 has five phase centers 204 at the observation angle 206-2. In this case, the phase centers 204 occur at different locations on the hand 202 relative to the phase centers 204 shown at 208-1. The constructive or destructive interference between the reflected portions of the radar signal that are reflected by the phase centers 204 results in a reflected radar signal 214-2, which is shown in a vector diagram 212-2. The reflected radar signal 214-2 has a larger amplitude and a different phase compared to the reflected radar signal 214-1. In this manner, a distributed target's signature, as represented by the reflected radar signals 214-1 and 214-2, varies at different observation angles 206. This variation, also known as speckle, can cause some radar processing techniques to produce noisy measurements that degrade accuracy performance of a radar, as further described with respect to FIG. 2-2.

FIG. 2-2 illustrates example complex radar data 216 for a distributed target at the observation angles 206-1 and 206-2 of FIG. 2-1. For simplicity, the complex radar data 216 shown for the observation angles 206-1 and 206-2 is associated with a single receive channel. The complex radar data 216 comprises multiple cells 218, each of which contains a sample 220 (e.g., in-phase and quadrature data) associated with the reflected radar signal 214 of FIG. 2-2. The cells 218 may be associated with different intervals of time, range, or Doppler. A size of the intervals represents a resolution of the radar system 102 along a corresponding dimension. The types of intervals characterize a state space of the complex radar data 216. In general, each sample 220 represents a single "look" or observation that is made by the radar system 102 for the given state space. Within the complex radar data 216, an amplitude of the sample 220 is represented with different patterns. A first pattern with a higher percentage of black represents a higher amplitude relative to a second pattern with a lower percentage of black (e.g., a higher percentage of white). In the depicted configuration, a portion of the hand 202 of FIG. 2-2 is represented by a trapezoid and reflections from the hand 202 influence at least two cells 218-1 and 218-2.

On the left side of FIG. 2-2, amplitudes of the samples 220 within the cells 218-1 and 218-2 differ, with the cell 218-1 having a larger amplitude relative to the cell 218-2 (as shown by the different patterns). This difference can result due to differences in constructive or destructive interference that occurs between scattered signals 222 within the cells 218-1 and 218-2. The scattered signals 222 represent different portions of the radar signal that are reflected by the phase centers 204. Because the hand 202 is a distributed target, the amplitudes within these cells 218 may change for different observation angles. At the observation angle 206-2, for example, the cell 218-1 has a smaller amplitude relative to the cell 218-2.

Some deterministic radar processing techniques determine a position of the hand 202 based on a cell 218 that has a highest amplitude. These techniques may be accurate for non-distributed targets, such as a corner reflector, which have a single phase center 204 that does not vary significantly at different observation angles. To further explain challenges resulting from applying deterministic radar processing techniques to a distributed target, assume that the hand 202 in FIG. 2-2 is at a same range from the radar system 102 at both the observation angles 206-1 and 206-2, and that the samples 220 within the cells 218-1 and 218-2 are associated with different range intervals that encompass the hand 202. Using the deterministic technique, a range to the hand 202 is determined with respect to the cell 218-1 when the hand 202 is at the observation angle 206-1 because the cell 218-1 has a highest amplitude within the complex radar data 216. When the hand 202 is at the observation angle 206-2, however, the range is determined with respect to the cell 218-2. Because these cells 218-1 and 218-2 represent different range intervals, the range to the hand 202 is observed to vary, which results in noisy position measurements, velocity or range rate measurements, radar cross section measurements, and so forth. This fluctuation or noise can further impact prediction or tracking techniques. Consequently, it may be challenging for a radar employing deterministic techniques to accurately observe small or fast targets, perform gesture recognition, presence detection, or provide collision avoidance.

In contrast, the techniques described herein analyze multiple "looks" of a target to reduce noise and improve measurement accuracy (e.g., position, velocity, range rate, radar cross section, and so forth). In this context, the term "look" refers to a complex sample that may be associated with a particular time interval, range interval, or Doppler frequency (e.g., a sample within a cell 218 of the complex radar data 216). The described techniques coherently average multiple cells 218 within the complex radar data 216, such as the cells 218-1 and 218-2, across multiple receive channels using a window. Because different samples 220 of a distributed target have some similarities or are related to one another in some way, use of the coherent averaging increases a gain and attenuates noise of radar data associated with the distributed target. The higher gain results in the radar data (e.g., position data) having a higher signal-to-noise ratio compared to other radar data generated without using coherent averaging. As such, the radar system 102 can achieve higher accuracies and compensate for any design or hardware limitations that enable the radar system 102 to be implemented within the smartphone 104. Example computing devices are further described with respect to FIG. 3.

Figure 3:
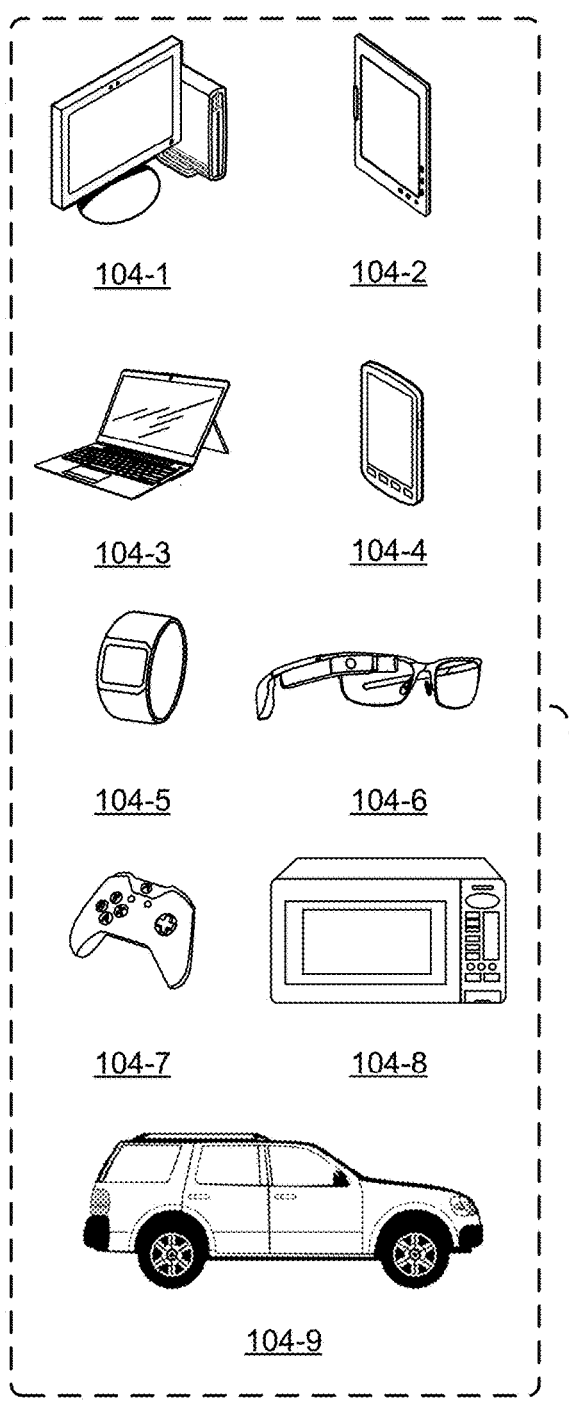
FIG. 3 illustrates an example radar system as part of a smartphone.
Figure 3:
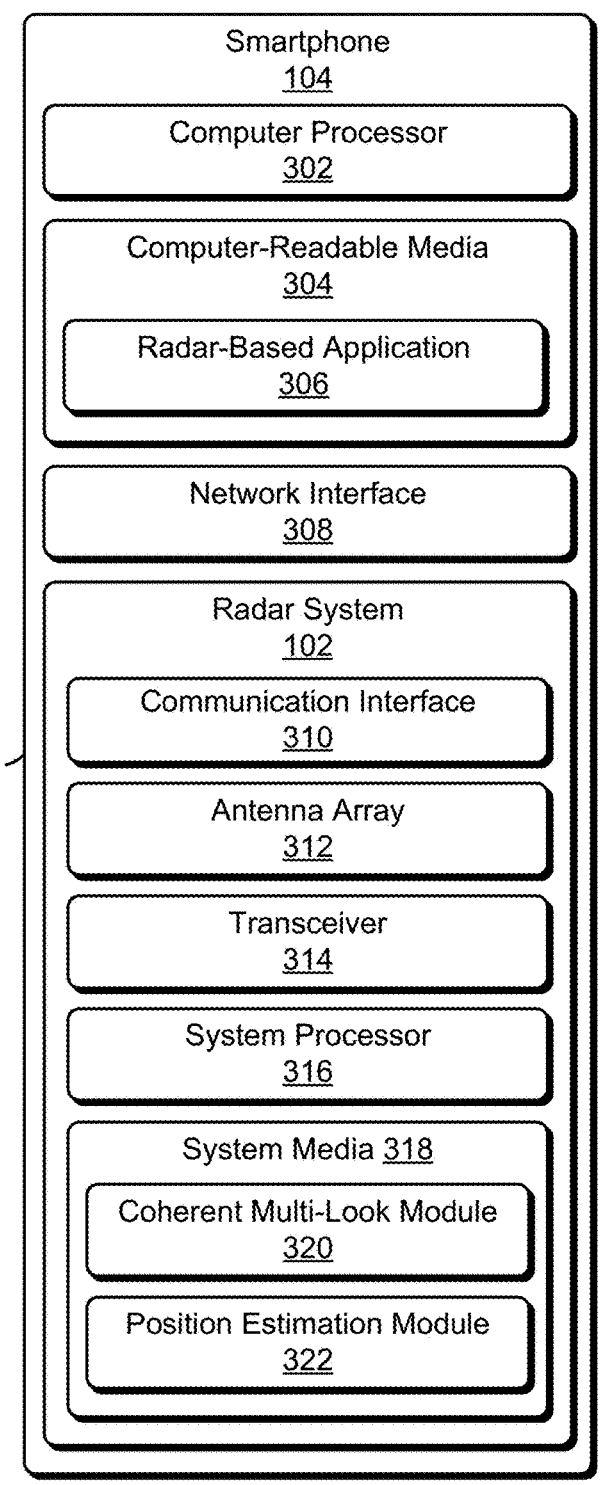

FIG. 3 illustrates the radar system 102 as part of the smartphone 104. The radar system 102 can alternatively be implemented within any suitable computing device or electronic device, such as a desktop computer 104-1, a tablet 104-2, a laptop 104-3, a phone 104-4, a computing watch 104-5, computing glasses 104-6, a gaming system 104-7, a microwave 104-8, and a vehicle 104-9. Other devices may also be used, such as televisions, drones, track pads, drawing pads, netbooks, e-readers, home-automation and control systems, and other home appliances. Note that device can be wearable, non-wearable but mobile, or relatively immobile (e.g., desktops and appliances). The radar system 102 can be used as a stand-alone radar system or used with, or embedded within, many different computing devices or peripherals, such as in control panels that control home appliances and systems, in automobiles to control internal functions (e.g., volume, cruise control, or even driving of the car), or as an attachment to a laptop computer to control computing applications on the laptop.

The smartphone 104 includes one or more computer processors 302 and computer-readable media 304, which includes memory media and storage media. Applications and/or an operating system (not shown) embodied as computer-readable instructions on the computer-readable media 304 can be executed by the computer processor 302 to provide some of the functionalities described herein. The computer-readable media 304 also includes a radar-based application 306, which uses radar data generated by the radar system 102 to perform a function, such as gesture-based control, presence detection, or collision avoidance for autonomous driving.

The smartphone 104 may also include a network interface 308 for communicating data over wired, wireless, or optical networks. For example, the network interface 308 may communicate data over a local-area-network (LAN), a wireless local-area-network (WLAN), a personal-area-network (PAN), a wire-area-network (WAN), an intranet, the Internet, a peer-to-peer network, point-to-point network, a mesh network, and the like. The smartphone 104 may also include a display (not shown).

The radar system 102 includes a communication interface 310 to transmit the radar data to a remote device, though this need not be used when the radar system 102 is integrated within the smartphone 104. In general, the radar data provided by the communication interface 310 is in a format usable by the radar-based application 306.

Figure 4:
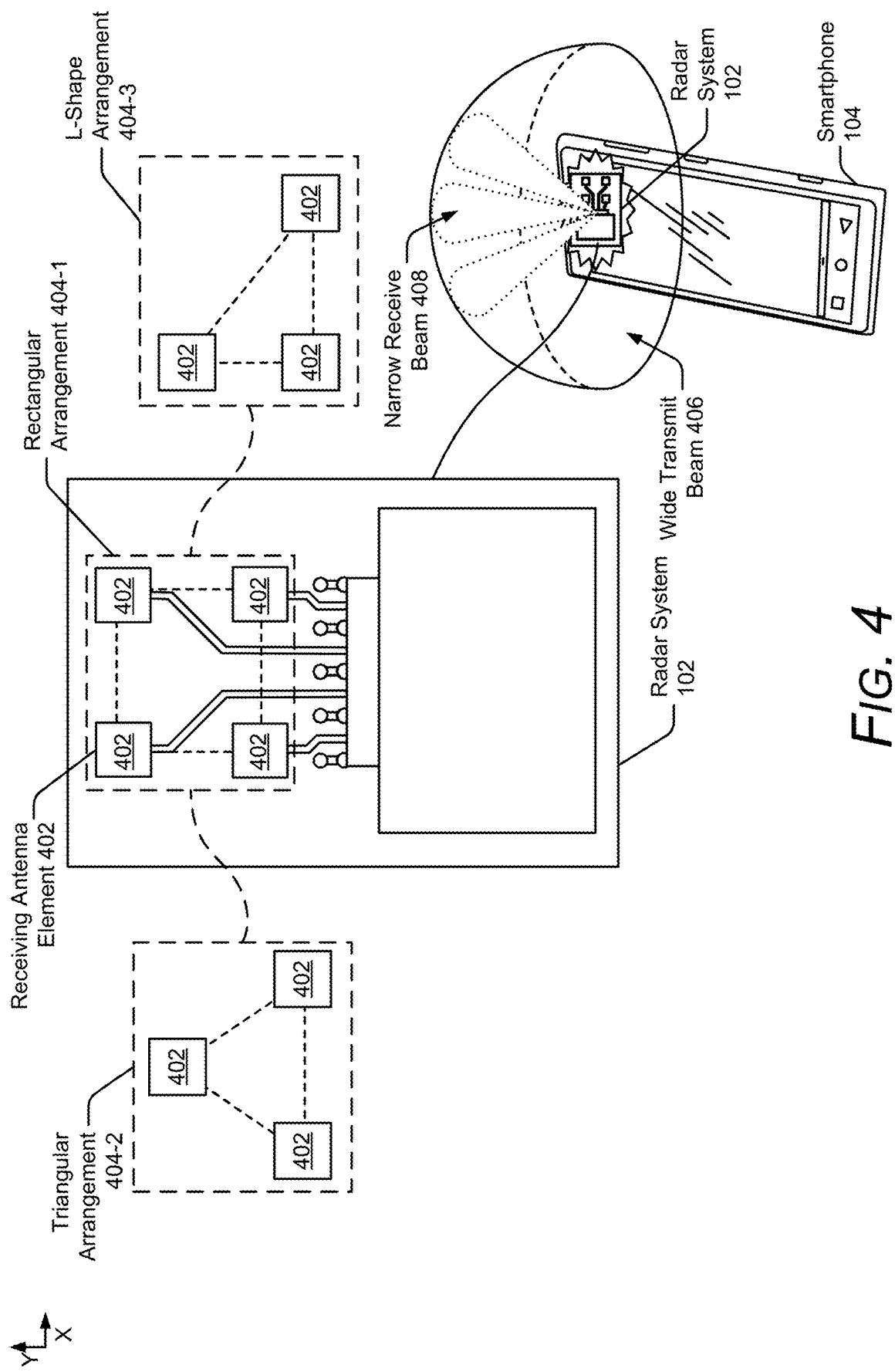
FIG. 4 illustrates example two-dimensional arrangements of receiving antenna elements within a radar system.

The radar system 102 also includes at least one antenna array 312 and at least one transceiver 314 to transmit and receive radar signals. The antenna array 312 includes at least one transmitting antenna element (not shown) and at least two receiving antenna elements (as shown in FIG. 4). In some cases, the antenna array 312 may include multiple transmitting antenna elements to implement a multiple-input multiple-output (MIMO) radar capable of transmitting multiple distinct waveforms at a given time (e.g., a different waveform per transmitting antenna element). The use of multiple waveforms can increase a measurement accuracy of the radar system 102. The receiving antenna elements can be positioned in a one-dimensional shape (e.g., a line) or a two-dimensional shape for implementations that include three or more receiving antenna elements. The one-dimensional shape enables the radar system 102 to measure one angular dimension (e.g., an azimuth or an elevation) while the two-dimensional shape enables two angular dimensions to be measured (e.g., both azimuth and elevation). Example two-dimensional arrangements of the receiving antenna elements within the antenna array 312 are further described with respect to FIG. 4.

FIG. 4 illustrates example two-dimensional arrangements of receiving antenna elements 402 within the radar system 102. If the antenna array 312 includes at least four receiving antenna elements 402, for example, the receiving antenna elements 402 can be arranged in a rectangular arrangement 404-1 as depicted in the middle of FIG. 4. Alternatively, a triangular arrangement 404-2 or an L-shape arrangement 404-3 may be used if the antenna array 312 includes at least three receiving antenna elements 402. Due to a size or layout constraint of the smartphone 104, an element spacing between the receiving antenna elements 402 or a quantity of the receiving antenna elements 402 may not be ideal for the angles at which the radar system 102 is to monitor. In different implementations, the element spacing may be less than, greater than, or equal to half a center wavelength of the radar signal.

Using the antenna array 312, the radar system 102 can form beams that are steered or un-steered, wide or narrow, or shaped (e.g., as a hemisphere, cube, fan, cone, or cylinder). As an example, the one or more transmitting antenna elements (not shown) may have an un-steered omnidirectional radiation pattern or may be able to produce a wide beam, such as the wide transmit beam 406. Either of these techniques enable the radar system 102 to illuminate a large volume of space. To achieve target angular accuracies and angular resolutions, the receiving antenna elements 402 can be used to generate thousands of narrow and steered beams (e.g., 2000 beams, 4000 beams, or 6000 beams), such as the narrow receive beam 408. In this way, the radar system 102 can efficiently monitor an external environment.

Returning to FIG. 3, the transceiver 314 includes circuitry and logic for transmitting and receiving radar signals via the antenna array 312. Components of the transceiver 314 can include amplifiers, mixers, switches, analog-to-digital converters, filters, and so forth for conditioning the radar signals. The transceiver 314 can also include logic to perform in-phase/quadrature (I/Q) operations, such as modulation or demodulation. A variety of modulations can be used to produce the radar signals, including linear frequency modulations, triangular frequency modulations, stepped frequency modulations, or phase modulations. The transceiver 314 can be configured to support continuous wave or pulsed radar operations.

A frequency spectrum (e.g., range of frequencies) that the transceiver 314 can use to generate radar signals may encompass frequencies between 1 and 400 gigahertz (GHz), between 4 and 100 GHz, or between 57 GHz and 63 GHz. In some cases, the frequency spectrum can be divided into multiple sub-spectrums that have similar or different bandwidths. Example bandwidths can be on the order of 500 megahertz (MHz), one gigahertz (GHz), two gigahertz, and so forth. Different frequency sub-spectrums may include, for example, frequencies between approximately 57 GHz and 59 GHz, 59 GHz and 61 GHz, or 61 GHz and 63 GHz. Although the example frequency sub-spectrums described above are contiguous, other frequency sub-spectrums may not be contiguous. To achieve coherence, multiple frequency sub-spectrums (contiguous or not) that have a same bandwidth may be used by the transceiver 314 to generate multiple radar signals, which are transmitted simultaneously or separated in time. In some situations, multiple contiguous frequency sub-spectrums may be used to transmit a single radar signal, thereby enabling the radar signal to have a wide bandwidth.

The radar system 102 may also include one or more system processors 316 and a system media 318 (e.g., one or more computer-readable storage media). Although the system processor 316 is shown to be separate from the transceiver 314 in FIG. 3, the system processor 316 may be implemented within the transceiver 314 in some implementations. The system processor 316 executes computer-readable instructions that are stored within the system media 318. Example digital operations performed by the system processor 316 can include Fast-Fourier Transforms (FFTs), filtering, modulations or demodulations, signal generation, and so forth.

The system media 318 includes a coherent multi-look module 320 and a position estimation module 322. The coherent multi-look module 320 can implement, at least partially, coherent multi-look radar processing for detecting a distributed target. The coherent multi-look module 320 generates position data, which can be processed by the position estimation module 322 to determine a position of the distributed target. The position estimation module 322 can use signal processing techniques or machine learning to analyze the position data. The coherent multi-look module 320 is further described with respect to FIG. 5.

Figure 5:
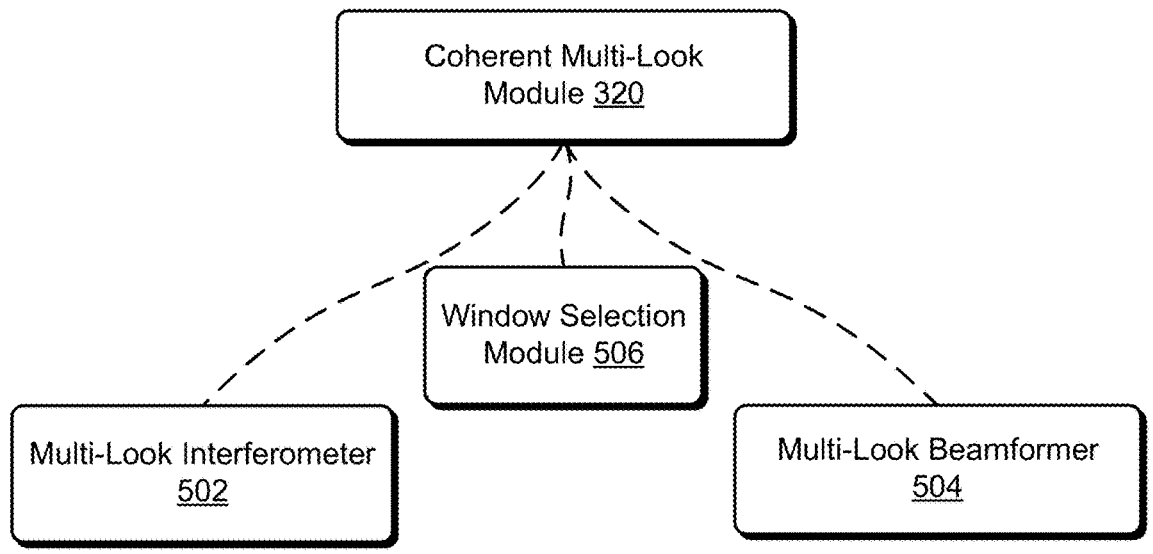
FIG. 5 illustrates an example coherent multi-look module for implementing a smartphone-based radar system capable of detecting user gestures using coherent multi-look radar processing.
Figure 5:
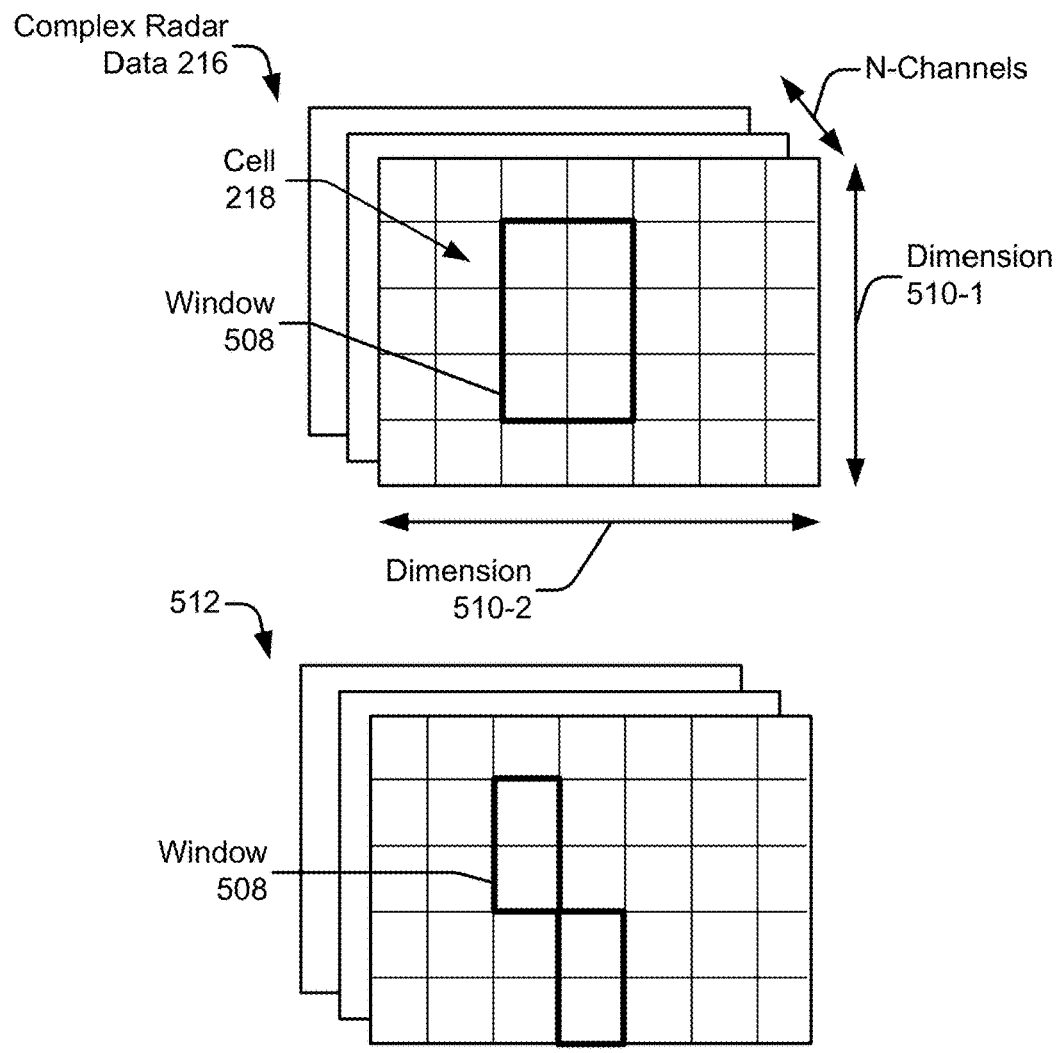

FIG. 5 illustrates an example coherent multi-look module 320 for implementing a smartphone-based radar system capable of detecting user gestures using coherent multi-look radar processing. The coherent multi-look module 320 can include a multi-look interferometer 502, a multi-look beamformer 504, or a window selection module 506. The coherent multi-look module 320 accepts complex radar data 216, which is provided by or derived from data produced by two or more receive channels (e.g., N-channels) within the transceiver 314. The receive channels are respectively coupled to the receiving antenna elements 402 of FIG. 4. In some cases, the receive channels may be associated with similar or different frequency sub-spectrums, or configured to process similar or different types of transmission waveforms. Dimensions 510-1 and 510-2 of the complex radar data 216 depend on the type of complex radar data 216 provided (e.g., a state space of the complex radar data 216), and may represent time, range, and/or Doppler frequency. Different types of complex radar data 216 are further described below with respect to FIG. 6.

The window selection module 506 determines a window 508 that identifies which relative cells 218 (e.g., or relative samples 220) are to be coherently averaged across the two or more receive channels. A size of the window 508 (e.g., a quantity of samples 220 selected) directly affects a signal-to-noise ratio, resolution, and a coherence of the position data that is produced. Although the window 508 is shown as a rectangle in FIG. 5, it may alternatively comprise an irregular shape or multiple shapes to select cells 218 that are contiguous (e.g., adjacent) or noncontiguous along at least one dimension 510. An example irregularly-shaped window 508 is shown at 512.

Generally there are trade-offs associated with the signal-to-noise ratio, resolution, and coherence of the position data.

Although a larger window 508 can increase stability or a signal-to-noise ratio of position data across different observation angles 206, the larger window 508 reduces a resolution of the position data along at least one dimension 510. In some cases, operations of the radar system 102 can be adjusted to counter-act the decreased resolution. For example, the update rate can be increased to improve resolution in the time or Doppler dimensions 510. If the window 508 becomes too large (e.g., larger than a size of the target), however, coherence and signal-to-noise ratio performance may decrease as some cells 218 or samples 220 within the window 508 may not be associated with the target of interest (e.g., may correspond to other targets or clutter within the external environment).

The window selection module 506 can evaluate these trade-offs to determine an appropriate window 508 to use for the coherent averaging. In some cases, the window selection module 506 may iteratively adjust the window 508 until an appropriate balanced between the signal-to-noise ratio, coherence, and resolution is achieved. The window selection module 506 may also access data stored in the computer-readable media 304 or the system media 318 to make this determination. If the radar-based application 306 instructs the radar system 102 to detect a particular type of target, such as a hand 202, the window selection module 506 may define the window 508 based on a physical size or shape of the hand 202 and a known resolution of the radar system 102. Consider if the hand 202 of FIG. 2 is approximately 18 centimeters and a resolution of a cell 218 within the complex radar data 216 is approximately 5 centimeters, the window selection module 506 may set the window 508 to include four cells 218 or fewer. In some cases, the window selection module 506 may also determine a weighting function for the window 508 or assign the relative cells 218 within the window 508 different weights. In this manner, the window selection module 506 identifies one or more regions of interest within the window 508, which can be used to achieve a target performance for different types of complex targets. In general, the window selection module 506 defines the window 508 in such a way as to optimize signal-to-noise ratio performance, resolution, and coherence, or to achieve a desired accuracy performance. The multi-look interferometer 502 or the multi-look beamformer 504 use the window 508 to process the complex radar data 216. In general, operations performed by the multi-look interferometer 502 or the multi-look beamformer 504 coherently average the samples within the window 508 across at least two receive channels. The multi-look interferometer 502 or the multi-look beamformer 504 produce position data based on this coherent averaging. The coherent multi-look module 320 is further described with respect to FIGS. 6-1, 6-2, and 7-10.

Figures 1, 6:
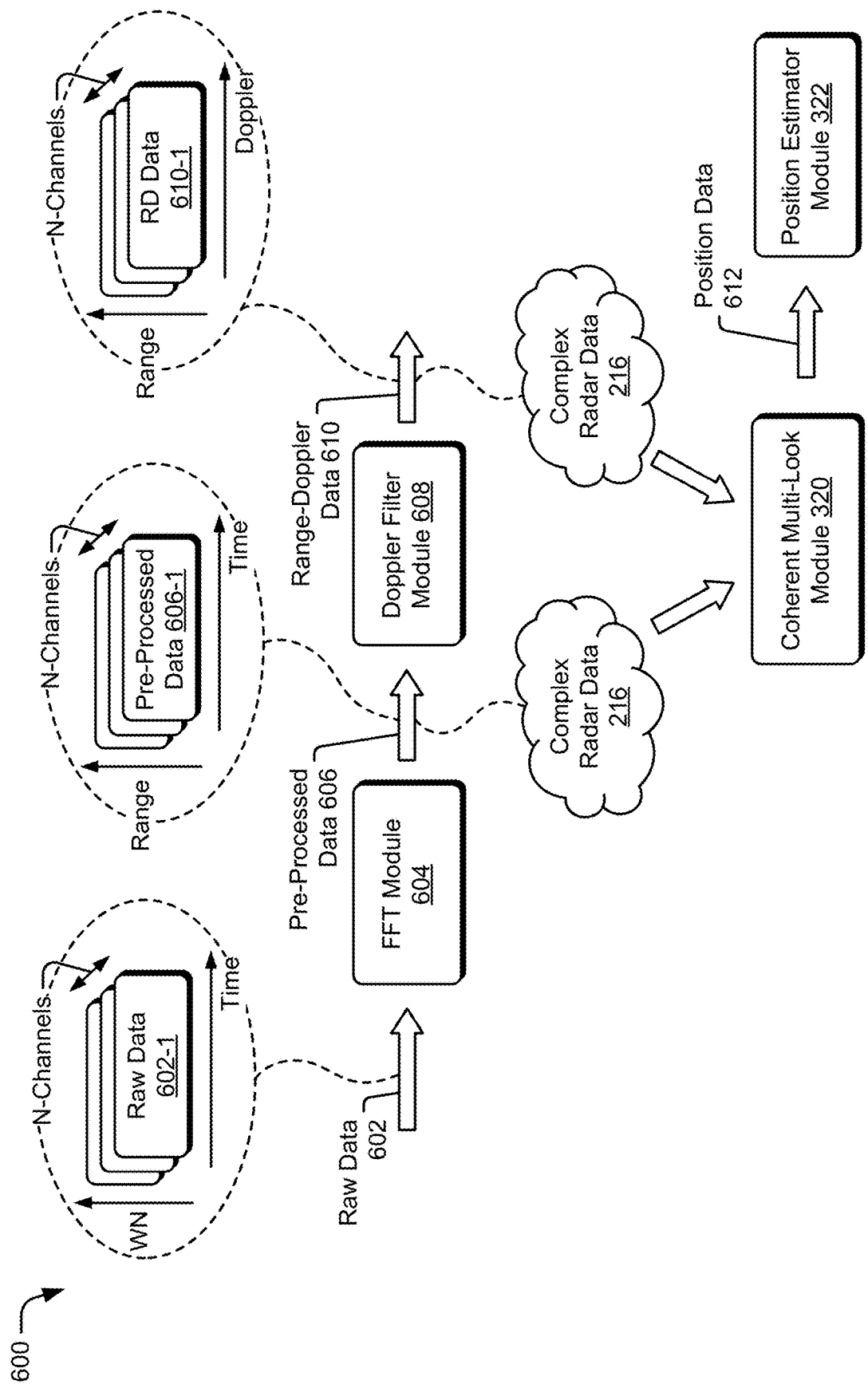
Figures 2, 6:
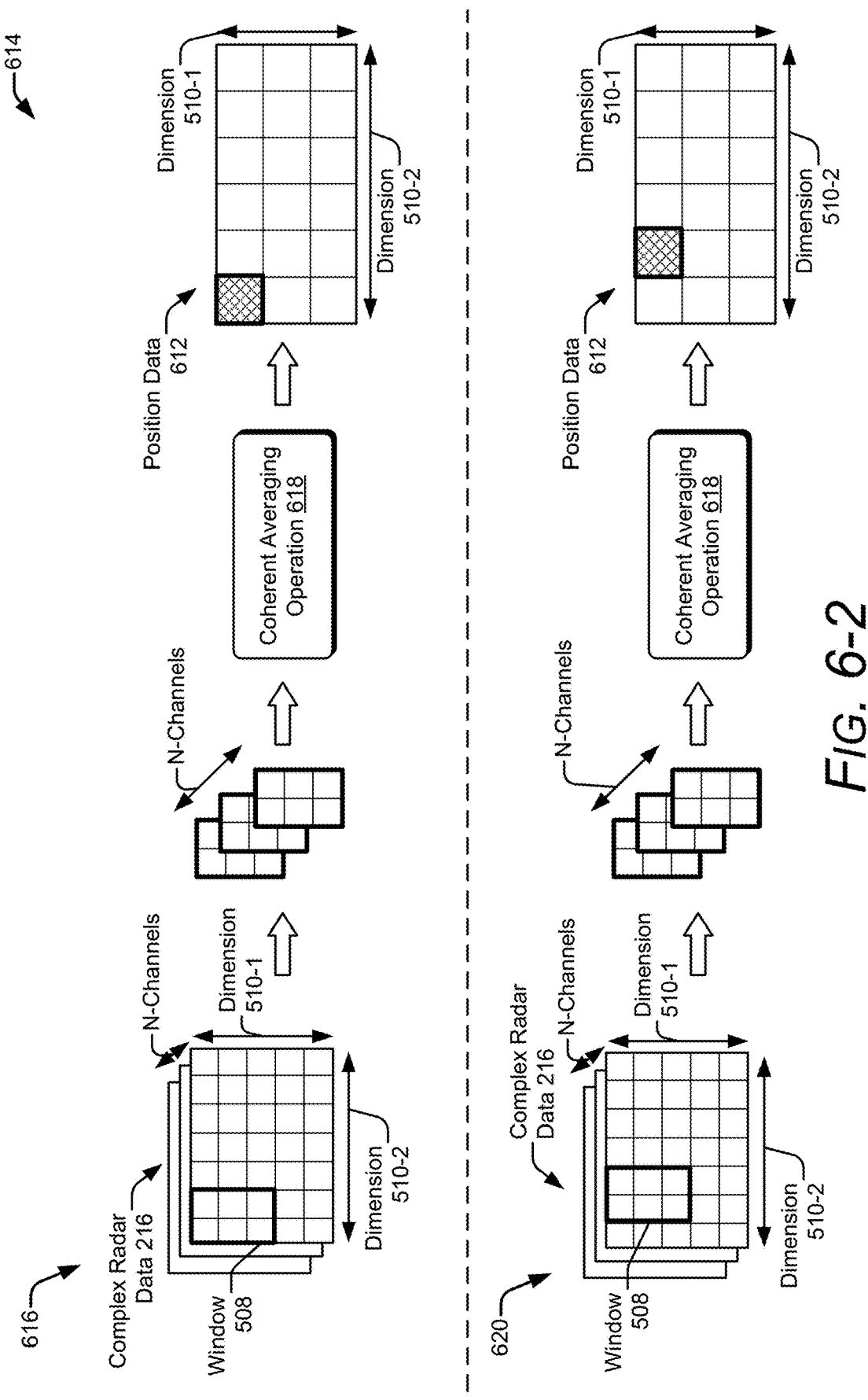

FIG. 6-1 illustrates an example flow sequence 600 for implementing a smartphone-based radar system capable of detecting user gestures using coherent multi-look radar processing. The system processor 316 accepts raw data 602 that is provided by the multiple receive chains of the transceiver 314. The raw data 602 represents digital responses from each of the receiving antenna elements 402 that are used to receive the reflected radar signal 214-1 or 214-2 of FIG. 2-1. A quantity of receiving antenna elements 402 and receive channels that produce the raw data 602 is represented by a variable N, which is a positive integer greater than one. The raw data 602 contains complex digital information across a period of time and for different wavenumbers (WN) associated with the reflected radar signal 214, as shown by raw data 602-1, which is associated with one of the N-channels.

A Fast-Fourier Transform (FFT) module 604, which may be implemented in hardware or software, performs a one-dimensional FFT operation on the raw data 602 for each time interval to convert from a wavenumber domain to a range domain. A resulting output of the FFT module 604 comprises pre-processed data 606. The pre-processed data 606 includes complex digital information across the period of time and for different range intervals, as shown by pre-processed data 606-1, which is associated with one of the N-channels. In some implementations, a Doppler filter module 608, which may be implemented in hardware or software, performs a one-dimensional FFT operation on the pre-processed data 606 for each range interval to convert from a time domain to a Doppler frequency domain. A resulting output of the Doppler filter module 608 comprises range-Doppler data 610. The range-Doppler data 610 includes complex digital information for different Doppler-frequency intervals and range intervals, as shown by range-Doppler data 610-1, which is associated with one of the N-channels.

The pre-processed data 606 and the range-Doppler data 610 represent different types of complex radar data 216, either of which can be provided to the coherent multi-look module 320. Using the range-Doppler data 610 instead of the pre-processed data 606 can further increase a signal-to-noise ratio of the position data. If the pre-processed data 606 is provided, the dimensions 510-1 and 510-2 of the complex radar data 216 correspond to range and time. In this case, a state space of the complex radar data 216 causes the multiple "looks" to be associated with different range intervals or time intervals. Alternatively if the range-Doppler data 610 is provided, the dimensions 510-1 and 510-2 of the complex radar data 216 correspond to range and Doppler frequency. In this case, the state space of the complex radar data 216 causes the multiple "looks" to be associated with different range intervals or Doppler frequencies. Although not shown, other implementations may use the raw data 602 as complex radar data 216, which causes the multiple "looks" to be associated with different wavenumbers or time intervals. The coherent multi-look module 320 performs coherent multi-look radar processing using the complex radar data 216 and generates position data 612, which is provided to the position estimation module 322. Based on the position data 612, the position estimation module 322 determines a position of one or more distributed targets that reflect the radar signal. Although not shown, the position information generated by the position estimation module 322 may be provided to other modules, such as a tracking module, a quantization module or a machine learning module. The coherent multi-look radar processing process is further described with respect to FIG. 6-2.

FIG. 6-2 illustrates an example flow sequence 614 performed by the coherent multi-look module 320 for implementing a smartphone-based radar system capable of detecting user gestures using coherent multi-look radar processing. In FIG. 6-2, the position data 612 is shown as comprising multiple cells, each of which contains a complex sample (e.g., in-phase and quadrature data). At 616, the coherent multi-look module 320 generates data for a top-left cell in the position data 612 (as identified by a diamond fill pattern). To generate this data, the coherent multi-look module 320 positions the window 508 around a first set of cells 218 within the complex radar data 216. These cells are extracted across the N-channels and are provided as input to a coherent averaging operation 618. The coherent averaging operation 618 can comprise a complex coherence operation performed by the multi-look interferometer 502 or a beamforming operation performed by the multi-look beamformer 504. A resulting output of the coherent averaging operation 618 produces the data for the identified cell in the position data 612.

At 620, the above sequence of steps is used to generate data for another cell within the position data 612. However, the window 508 is moved to a different position within the complex radar data 216, as shown. As such a series of coherent averaging operations 618 are performed over multiple sample subsets of the complex radar data 216. In this manner, the coherent multi-look module 320 coherently averages the multiple samples 220 within the complex radar data 216 using the window 508 and produces position data 612 based on the coherent averaging. Depending on an implementation of the coherent multi-look module 320, the series of coherent averaging operations 618 may be performed sequentially or in parallel. Although a relative cell size of the position data 612 is reduced relative to a cell size of the complex radar data 216 due to the coherent averaging operation 618, the coherent averaging operation 618 can be used to achieve an angular resolution on the order of a degree or less. Operations of the multi-look interferometer 502 and the multi-look beamformer 504 are further described with respect to FIGS. 7 and 8, respectively.

Figure 7:
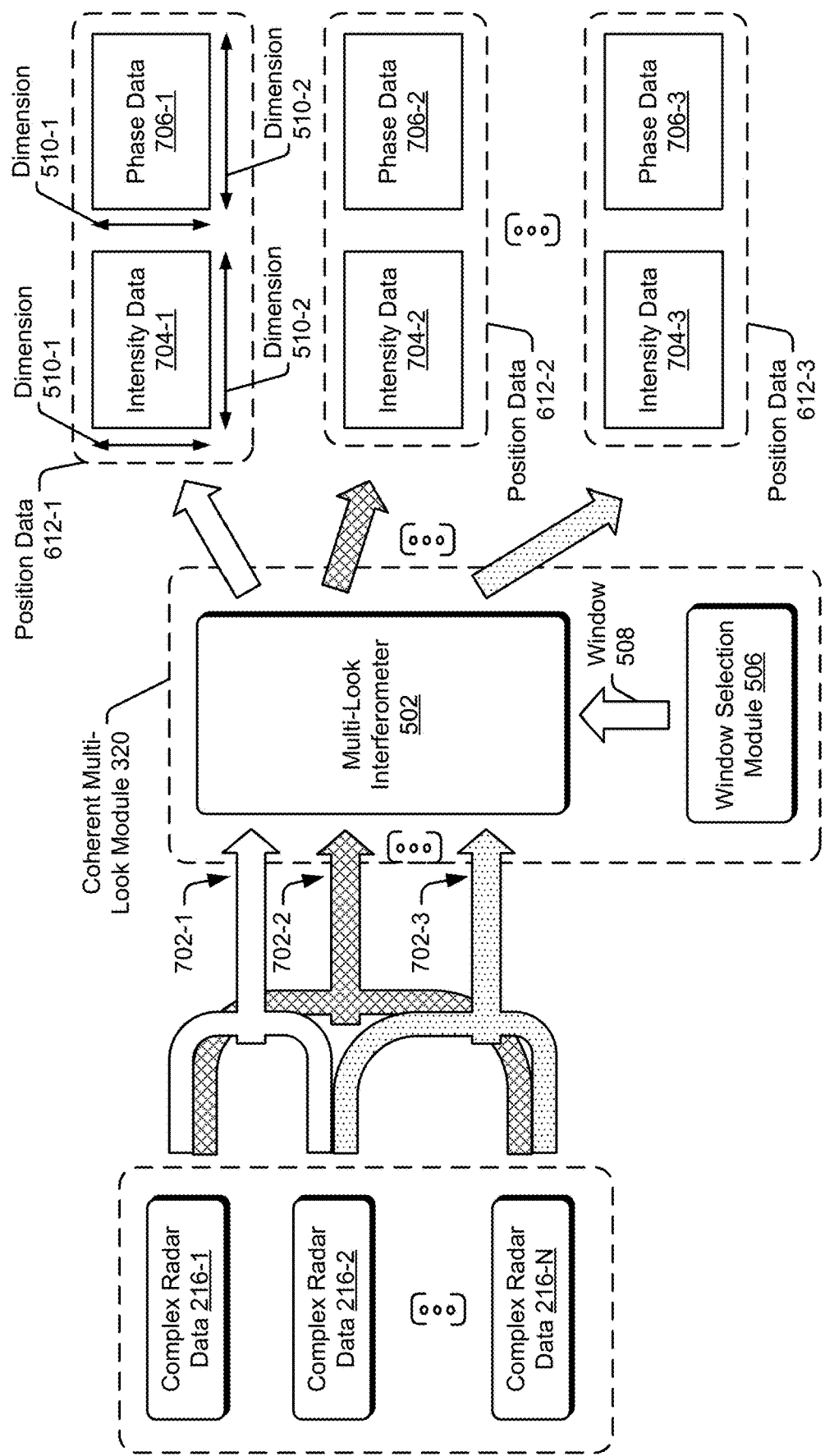
FIG. 7 illustrates an example multi-look interferometer for implementing a smartphone-based radar system capable of detecting user gestures using coherent multi-look radar processing.

FIG. 7 illustrates an example multi-look interferometer 502 for implementing a smartphone-based radar system capable of detecting user gestures using coherent multi-look radar processing. In the depicted configuration, the complex radar data 216 comprises complex radar data 216-1, 216-2 . . . 216-N, which are respectively associated with different receive channels. The multi-look interferometer 502 performs a complex coherence operation using complex radar data 216 associated with two of the receive channels to produce the position data 612. At 702-1, for example, the multi-look interferometer 502 performs the complex coherence operation using the complex radar data 216-1 and 216-2 to produce position data 612-1. The position data 612-1 comprises intensity data 704-1 and phase data 706-1. The intensity data 704-1 represents an amount of coherence within the window 508 and is calculated according to Equation 1:

$$|\rho| = \frac{E\{S_1 S_2^*\}}{\sqrt{E\{|S_1|^2\}E\{|S_2|^2\}}} \quad \text{Equation 1}$$

where $S_n$ comprises a matrix of samples 220 that are provided to the multi-look interferometer 502 based on the window 508 for a particular channel n, $E\{\ \}$ represents an expected value estimation, and "*" represents a complex conjugate. The intensity data 704 may be used by the position estimation module 322 to determine a quality of the position data 612. The phase data 706-1 is calculated according to Equation 2:

$$\theta = \frac{\text{Angle}(E\{S_1 S_2^*\})}{\sqrt{E\{|S_1|^2\}E\{|S_2|^2\}}} \quad \text{Equation 2}$$

As shown in Equation 1 and 2, the matrixes $S_1$ and $S_2$ are multiplied together, which effectively averages the samples 220 coherently across the two receive channels. The phase data 706-1 represents an angular position of the distributed target. By multiplying the phase data 706-1 by a predetermined factor, the position estimation module 322 can determine the angular position of the target. Instead of performing the complex coherence operation on samples 220 associated with a single cell 218 across the two receive channels, the multi-look interferometer 502 coherently averages samples 220 associated with more than one cell 218 across the two receive channels as determined by the window 508. This reduces noise in the phase data 706 and enables the position estimation module 322 to determine an accurate position of a distributed target.

The type of angular data that can be determined from the position data 612-1 depends on which receiving antenna elements 402 generate the complex radar data 216-1 and 216-2. If the complex radar data 216-1 and 216-2 correspond to the top two receiving antenna elements 402 within the rectangular arrangement 404-1 of FIG. 4, the phase data 706-1 is associated with a horizontal dimension and an azimuth angle of the distributed target can be determined. Alternatively, if the complex radar data 216-1 and 216-2 correspond to the left two receiving antenna elements 402 within the rectangular arrangement 404-1, the phase data 706-1 is associated with a vertical dimension and an elevation angle can be determined. To determine both azimuth and elevation, the multi-look interferometer 502 may analyze multiple pairs of complex radar data 216-1, 216-2 . . . 216-N, as shown in FIG. 7. At 702-2, for example, the multi-look interferometer 502 processes the complex radar data 216-1 and 216-N to produce the position data 612-2. Similarly at 702-3, the multi-look interferometer 502 uses the complex radar data 216-2 and 216-N to produce the position data 612-3.

In some cases, there may be redundancy within the position data 612 is multiple pairs of complex radar data 216-1, 216-2 . . . 216-N are processed by the multi-look interferometer 502. Position data 612 associated with either the top two receiving antenna elements 402 or the bottom two receiving antenna elements 402, for example, can be independently used to determine an azimuth angle to the target. For some antenna patterns or angles, however, the complex radar data 216 associated with these pairs of receiving antenna elements 402 may not be redundant. If the antenna pattern is not ideal, such as for some extreme angles, the complex radar data 216 associated with one of these pairs of receiving antenna elements 402 may produce phase data 706 with a relatively higher signal-to-noise ratio. Accordingly, the position estimation module 322 can include logic to select the phase data 706 with the highest signal-to-noise ratio for estimating a position of the target. While the multi-look interferometer 502 is not as complex and may perform fewer computations that the multi-look beamformer 504, the multi-look beamformer 504 may alternatively be used to perform coherent averaging across more than two channels of complex radar data 216, as described with respect to FIG. 8.

Figure 8:
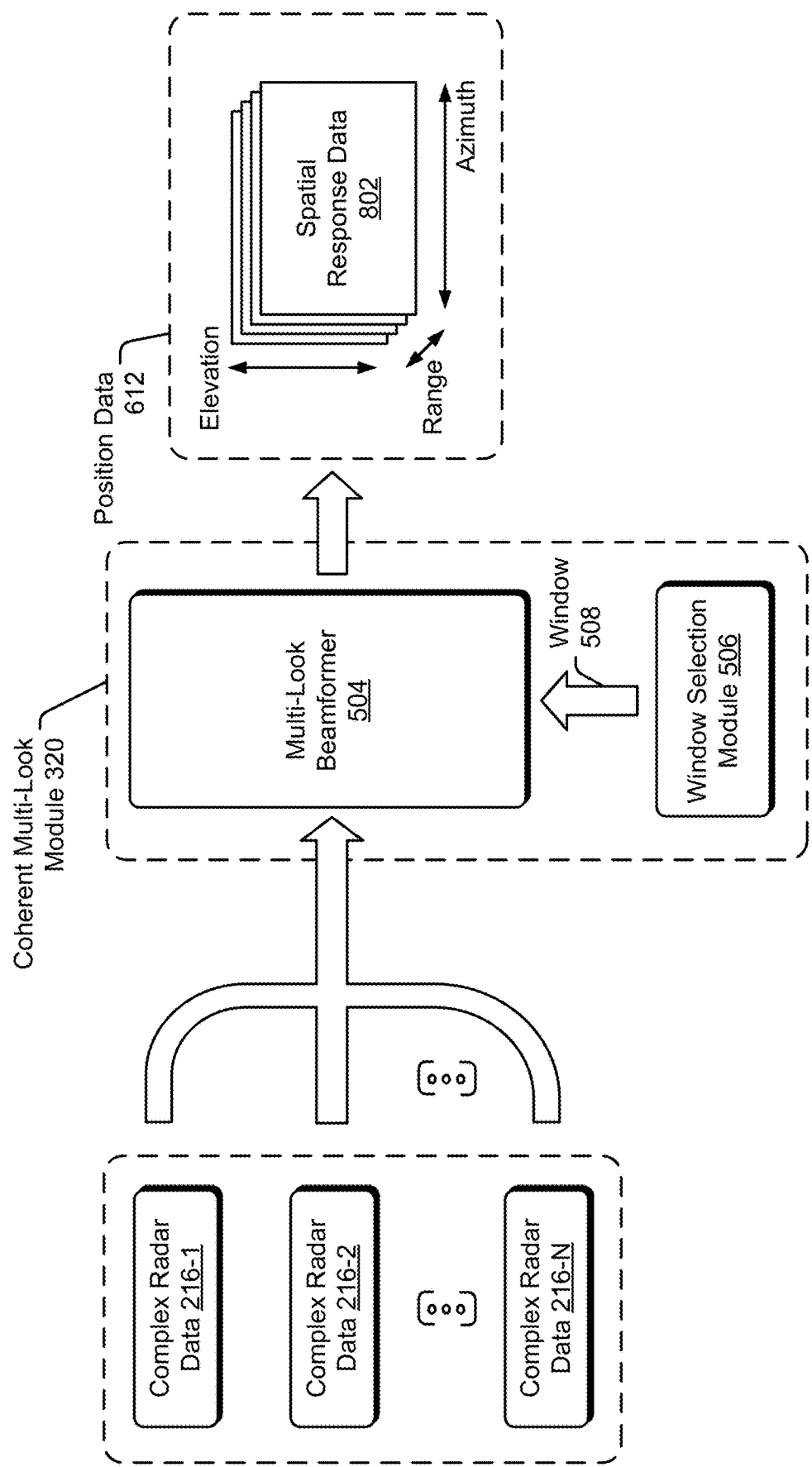
FIG. 8 illustrates an example multi-look beamformer for implementing a smartphone-based radar system capable of detecting user gestures using coherent multi-look radar processing.

FIG. 8 illustrates an example multi-look beamformer 504 for implementing a smartphone-based radar system capable of detecting user gestures using coherent multi-look radar processing. The multi-look beamformer 504 may employ linear or non-linear beamforming techniques using non-parametric algorithms or parametric algorithms. Example types of beamforming algorithms performed by the multi-look beamformer 504 include a Fourier beamforming algorithm, a minimum various distortionless response (MVDR) (e.g., Capon) beamforming algorithm, a multiple signal classification (MUSIC) beamforming algorithm, estimation of signal parameters via rotational invariance techniques (ESPRIT), a compressive sensing-based beamforming algorithm, and so forth.

The multi-look beamformer 504 produces the position data 612 based on the complex radar data 216 associated with two or more of the receive channels. To generate the position data 612, the multi-look beamformer 504 generates a covariance matrix based on the matrices of samples 220 that are identified by the window 508. In this way, the multi-look beamformer 504 coherently averages samples 220 associated with more than one cell 218 across the two receive channels as determined by the window 508. In some cases, the multi-look beamformer 504 may perform a covariance matrix denoising operation. The covariance matrix denoising operation performs an eigen-decomposition operation on the covariance matrix to produce eigenvalues of the covariance matrix. An eigenvalue that is associated with noise, which may be the weakest eigenvalue, is removed and a denoised covariance matrix is reconstructed based on the remaining eigenvalues.

The covariance matrix or the denoised covariance matrix is used as an input to a beamforming algorithm that is executed by the multi-look beamformer 504. The beamforming algorithm produces the position data 612, which comprises spatial response data 802. The spatial response data 802 contains complex digital information for a set of azimuths, elevations, and ranges. The set of azimuths and elevations represent a field of view for which different steering angles or beams are formed by the multi-look beamformer 504. By analyzing two or more channels of complex radar data 216, the multi-look beamformer 504 may produce position data 612 with a higher signal-to-noise ratio relative to the multi-look interferometer 502, thereby improving an accuracy of the position data 612.

In some implementations, the multi-look beamformer 504 may accept the pre-processed data 606 as the complex radar data 216. In this case, the position data 612 generated by the multi-look beamformer 504 can be provided to the Doppler filter module 608 of FIG. 6 to generate the range-Doppler data 610. A resulting output of the Doppler filter module 608 comprises range and Doppler information for multiple virtual channels, which represent the different beams the multi-look beamformer 504 analyzes. A quantity of the virtual channels is based on a quantity of beams. By limiting operations to a few beams, a quantity of computations performed by the multi-look beamformer 504 and the Doppler filter module 608 can be reduced to enable coherent multi-look radar processing in a variety of different smartphone 104, as further described with respect to FIG. 9.

Figure 9:
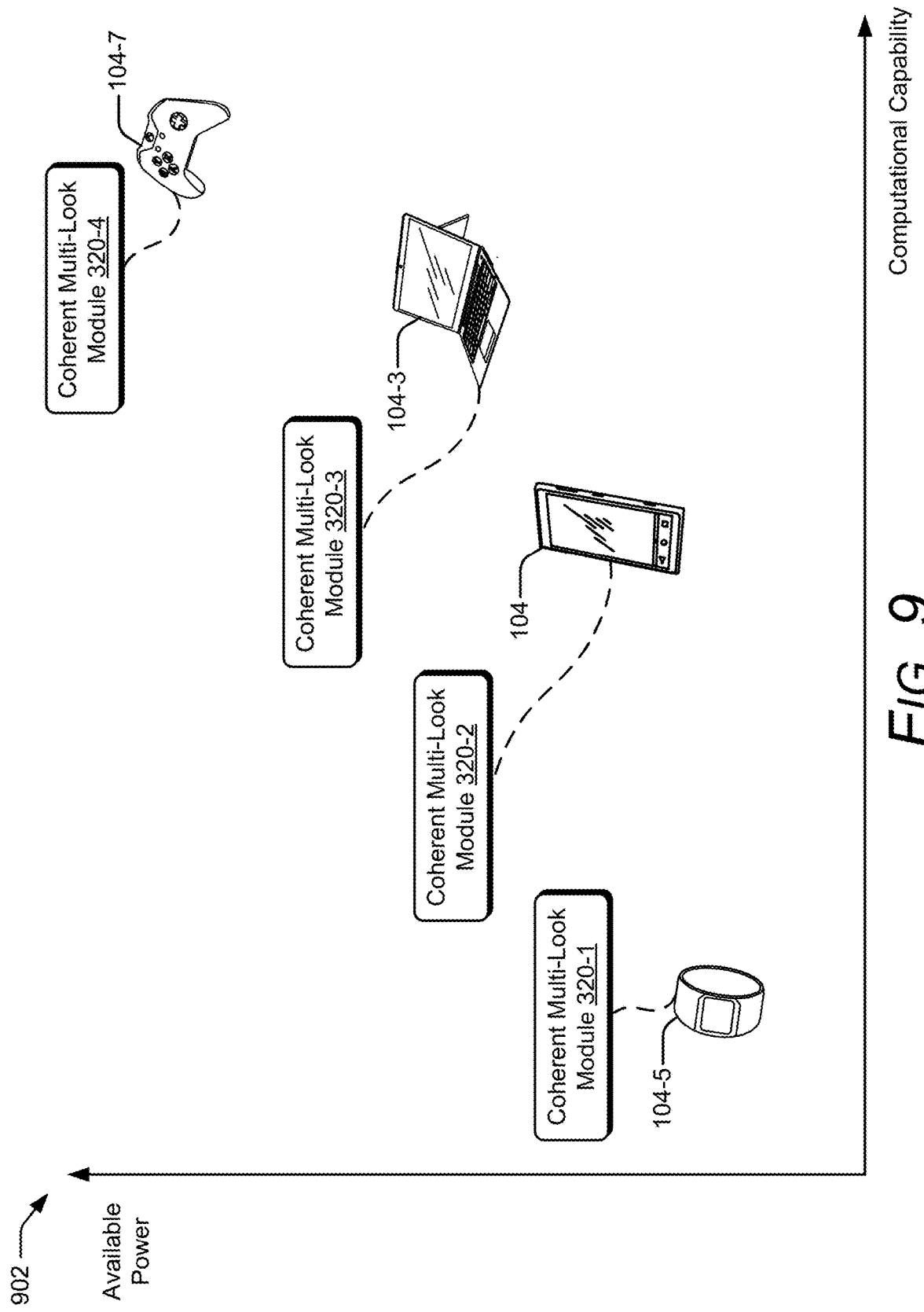
FIG. 9 illustrates an example suite of coherent multi-look modules that can be used to implement a radar system capable of detecting user gestures using coherent multi-look radar processing for a variety of computing devices.

FIG. 9 illustrates an example suite of coherent multi-look modules 320 that can be used to implement a radar system capable of detecting user gestures using coherent multi-look radar processing for a variety of computing devices. The example computing devices shown in FIG. 3 can vary in terms of available power, computational capability, available memory, types of radar-based applications (e.g., gesture sensing, presence detection, collision avoidance, or proximity detection), and physical size, which can affect a design of the radar system 102. In FIG. 9, a graph 902 illustrates differences between available power and computational capability for the computing watch 104-5, the smartphone 104 of FIG. 1, which is shown as a smartphone, the laptop 104-3 of FIG. 3, and the gaming system 104-7 of FIG. 3. In this example, the computing watch 104-5 is shown to have less computational capability and available power compared to the gaming system 104-7.

The suite of coherent multi-look modules 320 is shown to include coherent multi-look modules 320-1, 320-2, 320-3, and 320-4, which are designed to operate within the constraints or capabilities of the respective devices 104-5, 104, 104-3, and 104-7. For example, a low-power, non-computationally intensive coherent multi-look modules 320-1 can be implemented within the computing watch 104-5. To decrease power consumption and a quantity of computations, the coherent multi-look modules 320-1 may utilize the multi-look interferometer 502 to perform coherent multi-look radar processing. In other cases, a subset of the complex radar data 216 may be provided to the coherent multi-look module 320 to reduce the quantity of computations. For example, a subset of the range-Doppler data 610 may be provided to the coherent multi-look module 320 based on an estimated range or Doppler of the target. As such, fewer computations are performed to generate the position data 612. If the multi-look beamformer 504 is used within the coherent multi-look module 320-1, the multi-look beamformer 504 may be configured to analyze fewer beams or provide position data 612 for fewer angular positions. In some cases, a beam-scanning strategy may be used to incrementally determine an angular position of the target to a target accuracy level, as further described with respect to FIG. 10.

In contrast, a high-power, computationally-intensive coherent multi-look module 320-4 can be implemented within the gaming system 104-7, which enables the user to perform complex control gestures for a video game. In this case, the coherent multi-look module 320-4 may use the multi-look beamformer 504 to process a larger quantity of channels or beams. The multi-look beamformer 504 can also be used to analyze position data 612 for multiple targets that are present at a same time at a same range.

Figure 10:
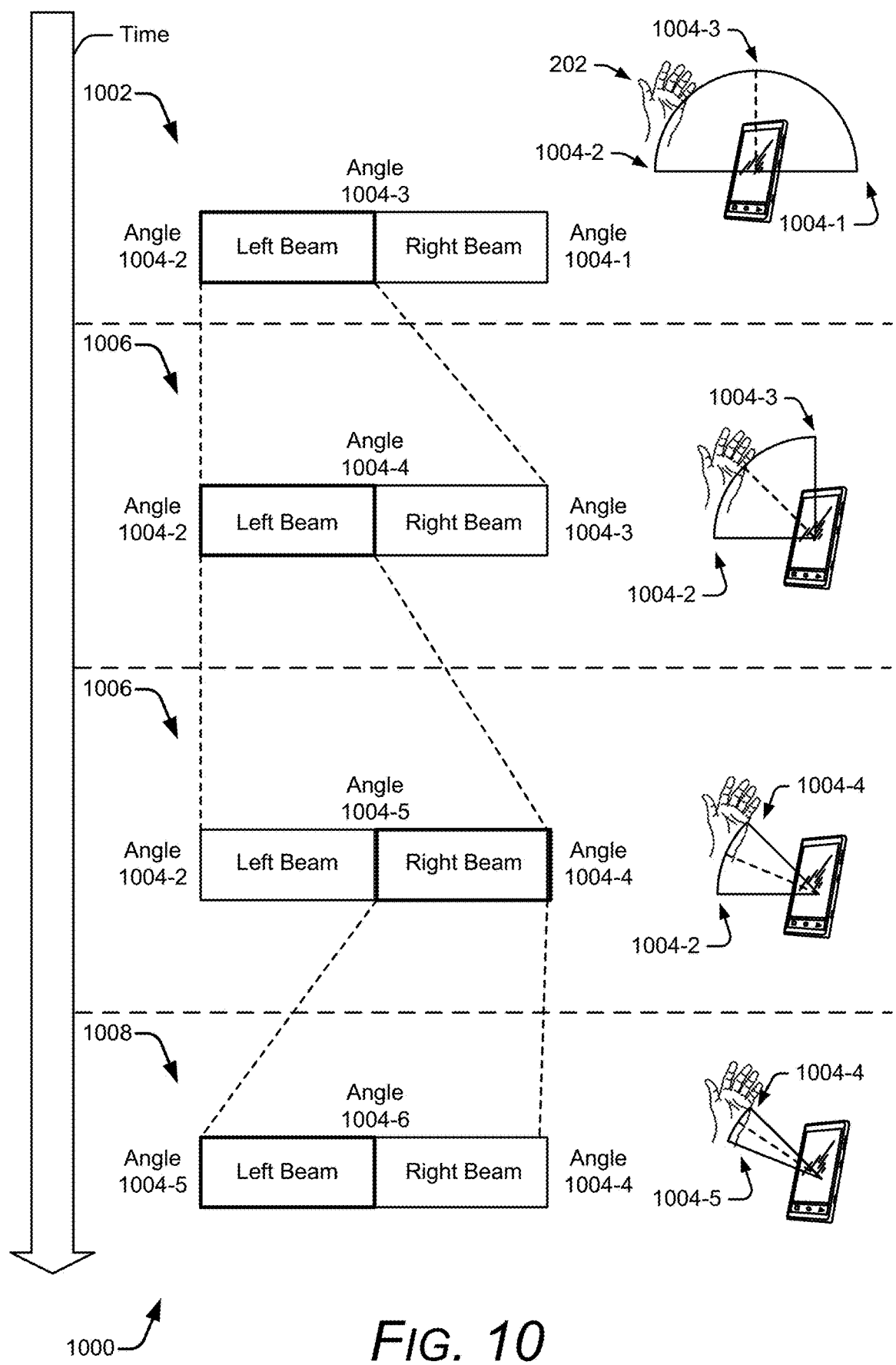
FIG. 10 illustrates an example flow sequence for beam scanning to implement a smartphone-based radar system capable of detecting user gestures using coherent multi-look radar processing.

FIG. 10 illustrates an example flow sequence 1000 for beam scanning to implement a smartphone-based radar system capable of detecting user gestures using coherent multi-look radar processing, with time flowing in a downward direction. This beam scanning technique can be used by the multi-look beamformer 504 to reduce computational complexity. As such, the multi-look beamformer 504 may be implemented within less computationally capable devices, such as the smartphone 104 or the computing watch 104-5 shown in FIG. 9.

To determine an angular position of the hand 202, the multi-look beamformer 504 produces position data 612 using a few beams, such as a left beam and a right beam. The position estimation module 322 determines which angular cell or beam the target is located in. Based on this determination, the multi-look beamformer 504 generates another few beams to generate updated position data 612. As the multi-look beamformer 504 and the position estimation module 322 recursively perform these operations, an angular resolution and accuracy of the radar system 102 improves.

At 1002, the coherent multi-look beamformer 504 uses two beams (e.g., a left beam and a right beam) to produce position data 612 for angular intervals between angles 1004-2 and 1002-3, and between angles 1004-3 and 1004-1, respectively. In this example, beamwidths of the left beam and the right beam are shown to be equal such that the angle 1004-3 is at a midpoint between the angles 1004-1 and 1004-2. In other implementations, the beamwidths may be unequal such that the angle 1004-3 is closer to the angle 1004-1 or the angle 1004-2. This may enable the beam scanning technique to "zero-in" on an accurate angular location of the target faster using prior knowledge or predictive information about the target. The position estimation module 322 determines the hand 202 to be within the left beam at 1002.

At 1006, the coherent multi-look beamformer 504 produces another few beams with narrower beamwidths relative to the beams used at 1002. In this case, the left beam encompasses angles between angles 1004-2 and 1004-4 while the right beam encompasses angles between angles 1004-4 and 1004-3. In this case, the position estimation module 322 determines the hand 202 to be within the left beam.

Similar to 1006, another set of beams is used by the coherent multi-look beamformer 504 based on the determination at 1006 to generate position data 612. In this case, the left beam encompasses angles between angles 1004-2 and 1004-5 and the right beam encompasses angles between angles 1004-5 and 1004-4. The position estimation module 322 determines the hand 202 to be within the right beam at this time.

At 1008, the beam scanning process may continue as described above, with the left beam encompassing angles between angles 1004-5 and 1004-6 while the right beam encompassing angles between angles 1004-6 and 1004-4. If a target angular resolution has been achieved, however, the position estimation module 322 may determine that the angle of the hand 202 is at angle 1004-6 (e.g., a midpoint between the angles 1004-5 and 1004-4).

Although two beams (e.g., a left beam and a right beam) are used at 1002, 1006, 1006, and 1008, more than two beams (e.g., three beams, four beams, or five beams) may be used with this beam scanning approach. While a larger quantity of beams increases a quantity of computations that are performed, a target accuracy level or angular resolution can be reached faster. The quantity of beams can be determined based on the computational capability of the smartphone 104 or the radar system 102, as described in FIG. 9.

Example Methods

Figure 11:
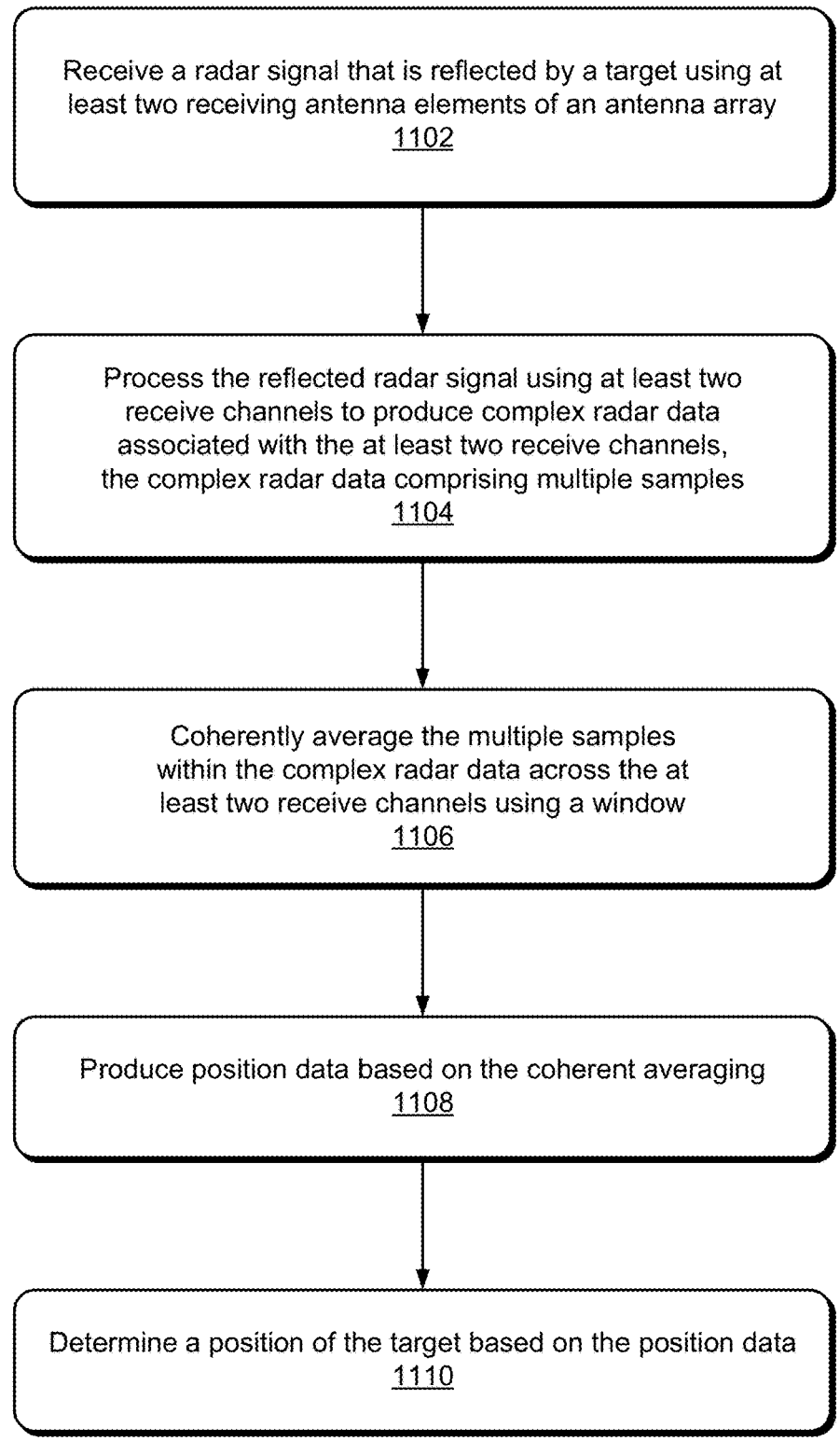
FIG. 11 illustrates an example method for performing operations of a smartphone-based radar system capable of detecting user gestures using coherent multi-look radar processing.

FIG. 11 depicts an example method 1100 for performing operations of a smartphone-based radar system capable of detecting user gestures using coherent multi-look radar processing. Method 1100 is shown as sets of operations (or acts) performed but not necessarily limited to the order or combinations in which the operations are shown herein. Further, any of one or more of the operations may be repeated, combined, reorganized, or linked to provide a wide array of additional and/or alternate methods. In portions of the following discussion, reference may be made to environment 100, FIG. 1, and entities detailed in FIG. 4 or 5, reference to which is made for example only. The techniques are not limited to performance by one entity or multiple entities operating on one device.

At 1102, a radar signal that is reflected by a target is received using at least two receiving antenna elements of an antenna array. For example, the receiving antenna elements 402 of FIG. 4 of the antenna array 312, for example, receive the reflected radar signal 214. In some cases, the target may comprise a distributed target that includes multiple phase centers 204, such as the hand 202 of FIG. 2-1.

At 1104, the reflected radar signal is processed using at least two receive channels to produce complex radar data associated with the at least two receive channels. The complex radar data comprises multiple samples. For example, the transceiver 314 of FIG. 3 includes two or more receive channels that respectively process the reflected radar signal 214 to produce the complex radar data 216-1, 216-2 . . . 216-N. The complex radar data 216-1, 216-2 . . . 216-N shown in FIGS. 7 and 8 are associated with a different receive channels and may comprise the pre-processed data 606 or the range-Doppler data 610 of FIG. 6-1. The complex radar data 216 comprises multiple samples 220, as shown in FIGS. 2-2, 5, and 6-2.

At 1106, the multiple samples within the complex radar data are coherently averaged across the at least two receive channels using a window. For example, the coherent multi-look module 320 coherently averages the multiple samples 220 of the complex radar data 216 across the at least two receive channels using the window 508, as shown in FIG. 6-2. To coherently average the multiple samples 220, the coherent multi-look module 320 performs a series of coherent averaging operations 618 with the window 508 selecting different subsets of samples 220 within the complex radar data 216. The window 508 may have a regular or irregular shape and identifies a relative subset of the samples 220 or cells 218 across the multiple receive channels. The multiple samples 220 can be averaged using the multi-look interferometer 502 or the multi-look beamformer 504, which respectively perform a complex coherence operation as described in FIG. 7 or a beamforming operation as described in FIG. 8.

At 1108, position data is produced based on the coherent averaging. For example, the multi-look interferometer 502 or the multi-look beamformer can produce the position data 612, as shown in FIG. 6-2.

At 1110, a position of the target is determined based on the position data. For example, the position estimation module 322 determines the position of the hand 202 based on the position data 612. By using coherent averaging, a signal-to-noise ratio of the position data 612 improves, which enables the radar system 102 to achieve target accuracies despite hardware or design constraints that may limit transmission power, resolutions, or signal bandwidths. In some cases, the radar system 102 may dynamically switch between using the multi-look interferometer 502 or the multi-look beamformer based on available power or available resources for performing the computations. Although described with respect to a distributed target, coherent multi-look radar processing may also be used to detect of other types of targets, including non-distributed targets.

Example Computing System

Figure 12:
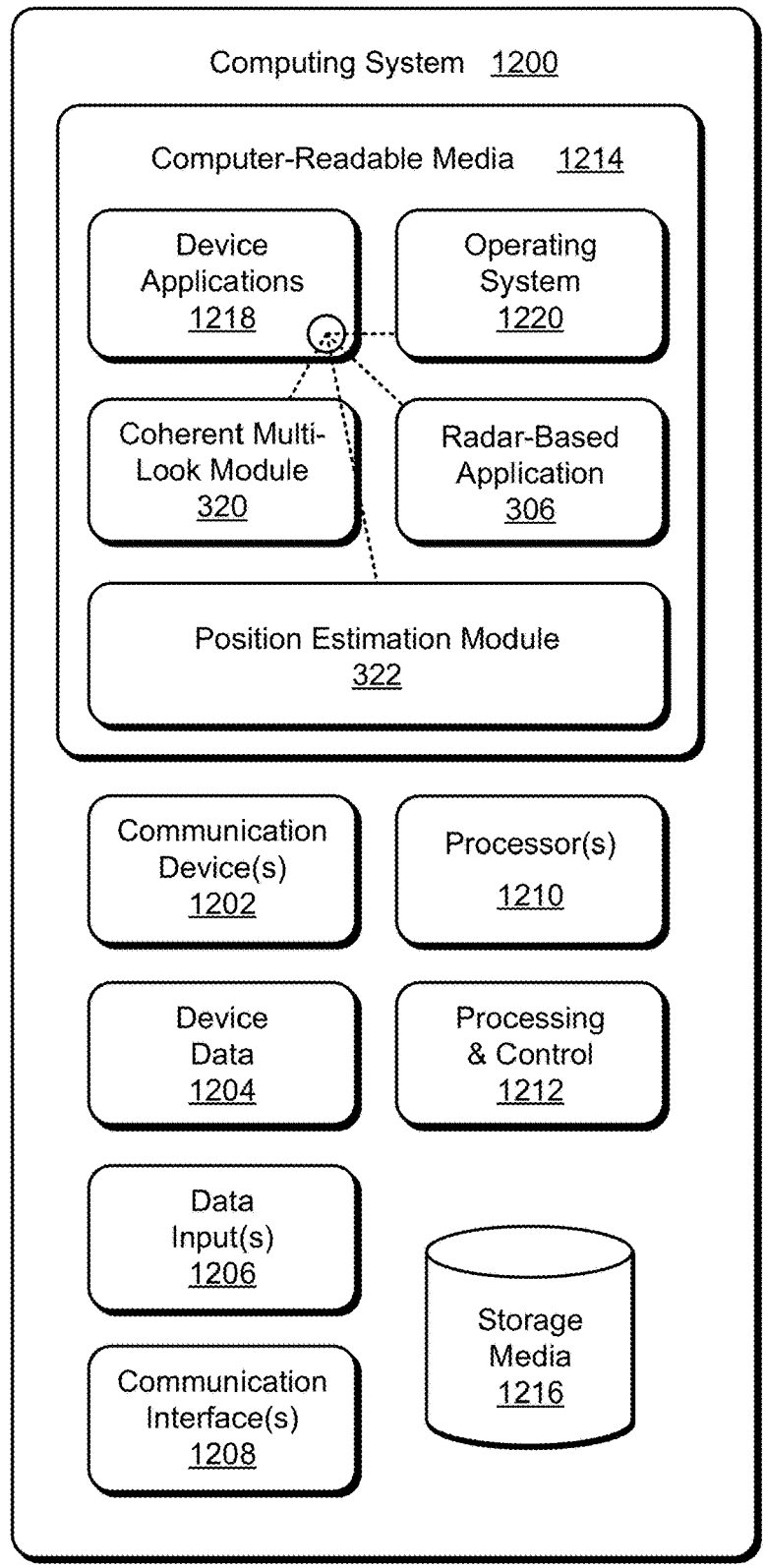
FIG. 12 illustrates an example computing system embodying, or in which techniques may be implemented that enable use of, a smartphone-based radar system capable of detecting user gestures using coherent multi-look radar processing.

FIG. 12 illustrates various components of an example computing system 1200 that can be implemented as any type of client, server, and/or computing device as described with reference to the previous FIG. 3 to implement coherent multi-look radar processing.

The computing system 1200 includes communication devices 1202 that enable wired and/or wireless communication of device data 1204 (e.g., received data, data that is being received, data scheduled for broadcast, data packets of the data). The device data 1204 or other device content can include configuration settings of the device, media content stored on the device, and/or information associated with a user of the device. Media content stored on the computing system 1200 can include any type of audio, video, and/or image data. The computing system 1200 includes one or more data inputs 1206 via which any type of data, media content, and/or inputs can be received, such as human utterances, the radar-based application 306, user-selectable inputs (explicit or implicit), messages, music, television media content, recorded video content, and any other type of audio, video, and/or image data received from any content and/or data source.

The computing system 1200 also includes communication interfaces 1208, which can be implemented as any one or more of a serial and/or parallel interface, a wireless interface, any type of network interface, a modem, and as any other type of communication interface. The communication interfaces 1208 provide a connection and/or communication links between the computing system 1200 and a communication network by which other electronic, computing, and communication devices communicate data with the computing system 1200.

The computing system 1200 includes one or more processors 1210 (e.g., any of microprocessors, controllers, and the like), which process various computer-executable instructions to control the operation of the computing system 1200 and to enable techniques for, or in which can be embodied, radar angular ambiguity resolution. Alternatively or in addition, the computing system 1200 can be implemented with any one or combination of hardware, firmware, or fixed logic circuitry that is implemented in connection with processing and control circuits which are generally identified at 1212. Although not shown, the computing system 1200 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The computing system 1200 also includes a computer-readable media 1214, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. The computing system 1200 can also include a mass storage media device (storage media) 1216.

The computer-readable media 1214 provides data storage mechanisms to store the device data 1204, as well as various device applications 1218 and any other types of information and/or data related to operational aspects of the computing system 1200. For example, an operating system 1220 can be maintained as a computer application with the computer-readable media 1214 and executed on the processors 1210. The device applications 1218 may include a device manager, such as any form of a control application, software application, signal-processing and control module, code that is native to a particular device, a hardware abstraction layer for a particular device, and so on.

The device applications 1218 also include any system components, engines, or managers to implement coherent multi-look radar processing. In this example, device applications 1218 include the coherent multi-look module 320 and the position estimation module 322.

Conclusion

Although techniques using, and apparatuses including, coherent multi-look radar processing have been described in language specific to features and/or methods, it is to be understood that the subject of the appended claims is not necessarily limited to the specific features or methods described. Rather, the specific features and methods are disclosed as example implementations of detecting a distributed target using coherent multi-look radar processing.

What is claimed is:

1. An apparatus comprising:
    a radar system comprising:
        at least two receiving antenna elements of an antenna array, the at least two receiving antenna elements configured to receive a radar signal that is reflected by a target;
        at least two receive channels respectively coupled to the at least two receiving antenna elements, the at least two receive channels jointly configured to process the reflected radar signal to produce complex radar data associated with each of the at least two receive channels, the complex radar data comprising multiple samples; and
        a processor coupled to the at least two receive channels, the processor configured to:
            coherently average the multiple samples within the complex radar data across the at least two receive channels using a window; and
            determine an angular position of the target based on the coherent averaging.

2. The apparatus of claim 1, wherein the processor is configured to generate a statistical estimation of the target's radar signature based on the coherent averaging.

3. The apparatus of claim 2, wherein the processor is further configured to generate a covariance matrix of the multiples samples within the window to generate the statistical estimation.

4. The apparatus of claim 2, wherein the processor is further configured to perform a complex coherent operation on the multiple samples within the window to generate the statistical estimation.

5. The apparatus of claim 4, wherein:
    first complex radar data comprises a portion of the multiple samples associated with a first receive channel of the at least two receive channels;
    second complex radar data comprises another portion of the multiple samples associated with a second receive channel of the at least two receive channels; and
    the processor is further configured to perform an expected value estimation of a multiplication of the first complex radar data with a complex conjugate of the second complex radar data to perform the complex coherent operation.

6. The apparatus of claim 1, wherein:
    the target comprises a distributed target having multiple phase centers; and
    the reflected radar signal comprises a superposition of multiple portions of the radar signal that are reflected by the multiple phase centers.

7. The apparatus of claim 6, wherein the processor is configured to recognize a gesture based on the angular position, the gesture performed using the distributed target.

8. The apparatus of claim 6, wherein the distributed target comprises a human body part.

9. The apparatus of claim 1, wherein the apparatus comprises a smartphone.

10. The apparatus of claim 1, wherein the apparatus comprises a home-automation and control system.

11. The apparatus of claim 1, wherein the apparatus is mobile.

12. The apparatus of claim 1, wherein the radar signal includes frequencies between 57 and 63 gigahertz.

13. The apparatus of claim 1, wherein the radar system comprises:
a transmitter configured to generate the radar signal; and
at least one transmitting antenna element of the antenna array, the transmitting antenna element configured to use a omnidirectional radiation pattern to transmit the radar signal.

14. The apparatus of claim 1, wherein:
the at least two receiving antenna elements comprise at least three receiving antenna elements; and
the at least three receiving antenna elements are arranged in a triangular arrangement or an L-shape arrangement.

15. The apparatus of claim 1, wherein:
the at least two receiving antenna elements comprise at least four receiving antenna elements; and
the at least four receiving antenna elements are arranged in a rectangular arrangement.

16. A method comprising:
receiving a radar signal that is reflected by a distributed target, the distributed target having multiple phase centers;
processing the reflected radar signal using at least two receive channels to produce complex radar data associated with each of the at least two receive channels;
generating a statistical estimation of the distributed target's radar signature by averaging subsets of the complex radar data across the at least two receive channels using a sliding window; and
determining a position of the distributed target based on the statistical estimation.

17. The method of claim 16, further comprising adjusting a size of the sliding window according to dimensions of a particular type of target.

18. The method of claim 16, wherein:
the complex radar data has a first dimension and a second dimension; and
the complex radar data comprises first complex radar data and second complex radar data, the first complex radar data associated with a first receive channel of the at least two receive channels, the second complex radar data associated with a second receive channel of the at least two receive channels, the method further comprising:
positioning the sliding window at a first location associated with the first dimension and the second dimension;
averaging a first subset of the first complex radar data with a first subset of the second complex radar data, the first subset of the first complex radar data and the first subset of the second complex radar data comprising samples that are within the sliding window; and
producing a first complex number of position data based on the averaging of the first subset of the first complex radar data with the first subset of the second complex radar data.

19. The method of claim 18, further comprising:
positioning the sliding window at a second location associated with the first dimension and the second dimension;
averaging a second subset of the first complex radar data with a second subset of the second complex radar data, the second subset of the first complex radar data and the second subset of the second complex radar data comprising other samples that are within the sliding window; and
producing a second complex number of the position data based on the averaging of the second subset of the first complex radar data with the second subset of the second complex radar data.

20. The method of claim 16, wherein:
the complex radar data comprises range-Doppler data with dimensions associated with range and Doppler frequency; or
the complex radar data comprises pre-processed data with dimensions associated with range and time.

* * * * *